United States Patent [19]
Gillingham et al.

[11] Patent Number: 5,357,755
[45] Date of Patent: Oct. 25, 1994

[54] TRAP APPARATUS WITH BYPASS

[75] Inventors: Gary R. Gillingham, Prior Lake; Marty A. Barris, Lakeville; Charles O. Reinhart, Minneapolis; Julian A. Imes, Jr., Bloomington; Erland D. Anderson, Farmington; Peter A. Betts, Prior Lake, all of Minn.

[73] Assignee: Donaldson Company, Inc., Minneapolis, Minn.

[21] Appl. No.: 36,044

[22] Filed: Mar. 23, 1993

Related U.S. Application Data

[63] Continuation-in-part of Ser. No. 589,050, Sep. 27, 1990, Pat. No. 5,212,948.

[51] Int. Cl.$^5$ ............................................. F01N 3/02
[52] U.S. Cl. ............................. 60/288; 60/286; 60/295; 60/311; 55/314; 55/466; 55/DIG. 30
[58] Field of Search ............ 60/288, 286, 295, 311; 55/DIG. 30, 466, 312, 314

[56] References Cited

U.S. PATENT DOCUMENTS

| | | | |
|---|---|---|---|
| 4,281,512 | 8/1981 | Mills | 60/311 |
| 5,085,049 | 2/1992 | Rim | 60/288 |

FOREIGN PATENT DOCUMENTS

| | | | |
|---|---|---|---|
| 3436274 | 4/1986 | Fed. Rep. of Germany | 60/288 |
| 101522 | 6/1984 | Japan | 60/288 |

*Primary Examiner*—Douglas Hart
*Attorney, Agent, or Firm*—Merchant, Gould, Smith, Edell, Welter & Schmidt

[57] ABSTRACT

Trap muffler apparatus with bypass around a trap core is disclosed. A preferred bypass arrangement utilizing a tubular shutter valve system is described. Forward or reverse regeneration are possible. Bypass to atmosphere without filtration is avoided with dual in-line traps or with the segmented trap and control of exhaust gases to traps not being regenerated.

11 Claims, 20 Drawing Sheets

FIG. 5
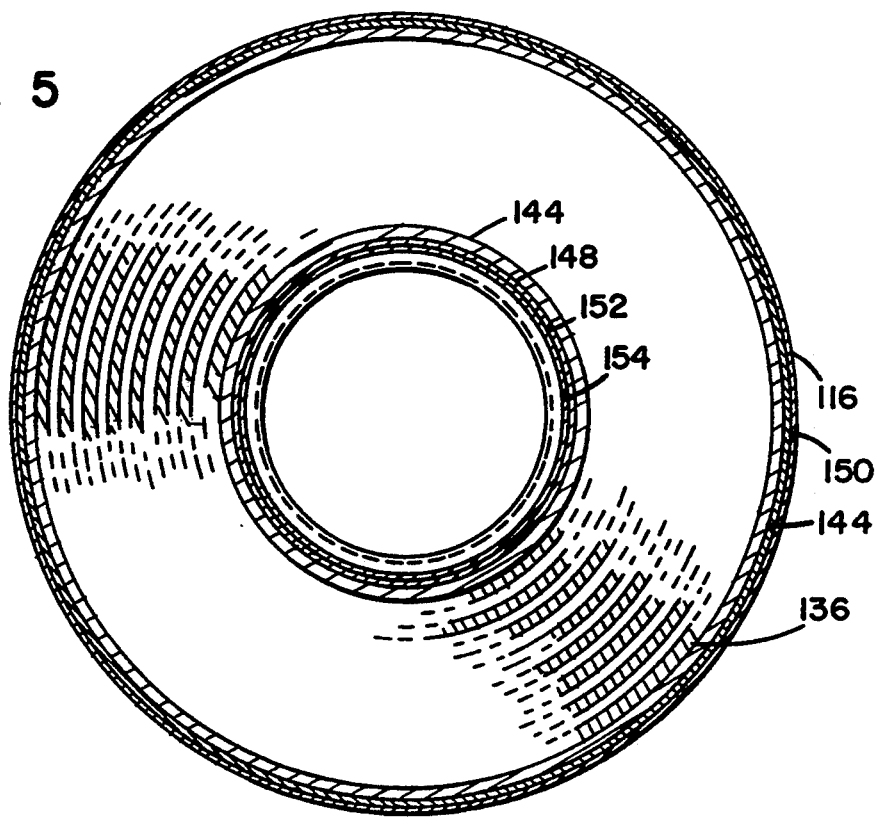
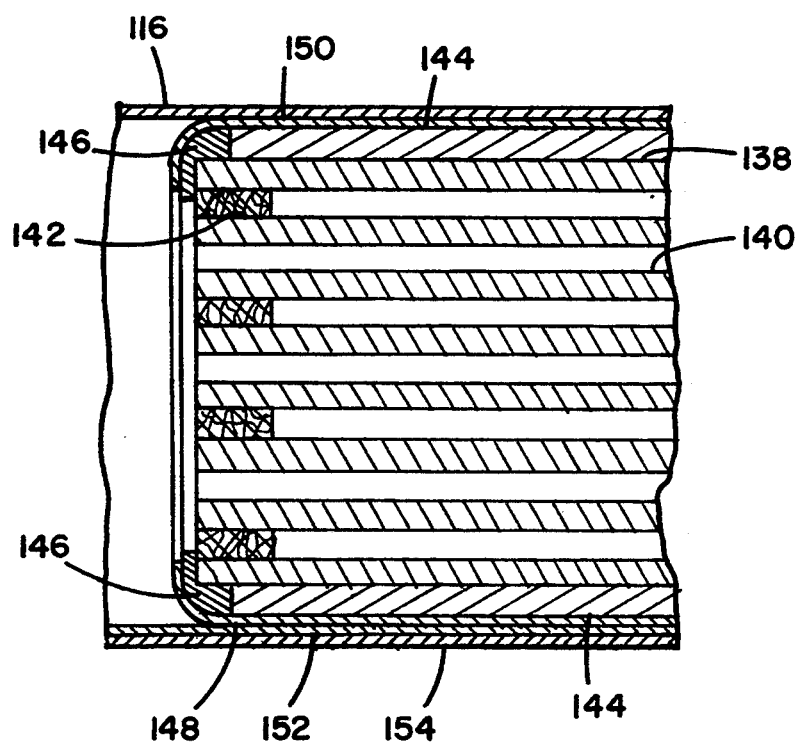
FIG. 6

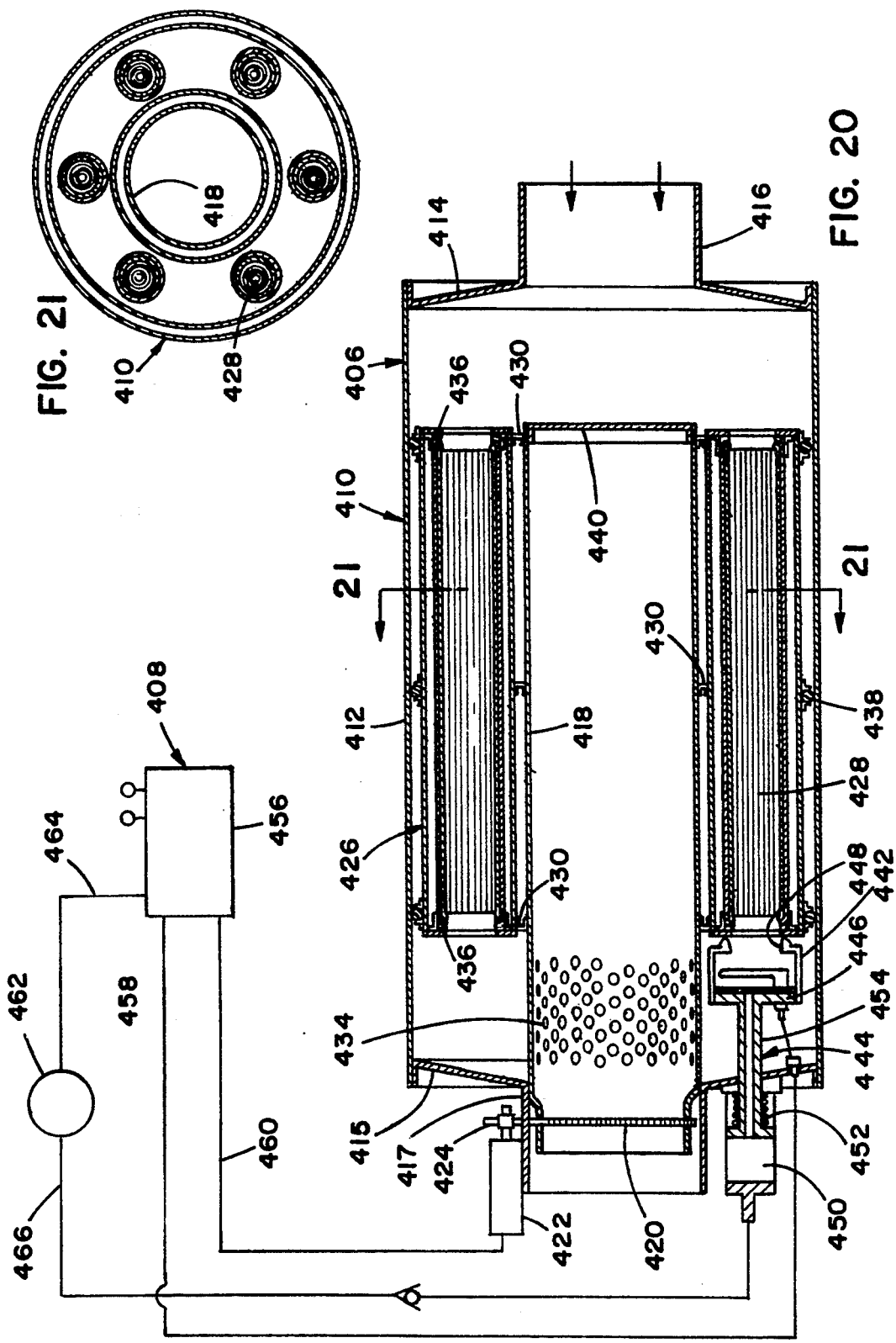

TRAP APPARATUS WITH BYPASS

CROSS-REFERENCE TO RELATED APPLICATIONS

The present application is a continuation-in-part of U.S. application Ser. No. 07/589,050 filed Sep. 27, 1990, now U.S. Pat. No. 5,212,948.

FIELD OF THE INVENTION

The invention is directed generally to trap devices and trap muffler devices for vehicles, primarily vehicles powered by diesel engines. The invention concerns an internal bypass so that exhaust gases can be directed around a regenerating trap.

BACKGROUND OF THE INVENTION

Current trap mufflers (e.g., U.S. Pat. No. 4,851,015) provide for trap regeneration and, during regeneration, have an external bypass which exhausts through an alternative muffler to atmosphere or through an alternative trap muffler system to atmosphere. The problem is that trap filters become clogged and must be periodically regenerated by burning or oxidizing the particulates captured therein. For regeneration systems having electrical heaters, there is insufficient vehicle electrical energy to create sufficient continuing heat to maintain regeneration if exhaust continues to flow through the trap during regeneration without major additions to the electrical system. (Some systems, e.g., burners, are capable of providing sufficient heat without bypass.) In addition, current systems bypass into additional devices. Thus, current systems, although effective in a laboratory setting, are very bulky and somewhat complex when installed to provide a complete vehicle capability. Reduction in size and complexity results in less cost, weight, etc., and is clearly desirable. The present invention addresses this problem.

Additionally, regeneration of current trap filters proceeds in a forward direction from upstream nearest the engine to downstream nearest atmosphere. The filters load more greatly at the downstream end. As a flame front during regeneration proceeds, on many systems it may not completely oxidize particulate build-up at the downstream end and, over time, the filter may become clogged or, following regeneration, burn with extreme temperatures to the point of damaging the filter. The present invention provides an advantageous concept for internal bypass which furthermore allows reverse regeneration starting at the downstream end where the greater particulate build-up exists and proceeding toward the upstream end.

Many other features of the invention which address these and other problems with current systems will become apparent hereinafter.

SUMMARY OF THE INVENTION

The present invention is directed to apparatus for processing exhaust gases from an engine. The apparatus includes a housing with first and second flow paths for exhaust gases flowing in a forward direction with respect to inlets upstream and outlets downstream. An acoustic element is located within the housing for attenuating the sound of the exhaust gases along both the first and second flow paths. The housing has a filtering mechanism for filtering particulates from the exhaust gases. A valve mechanism diverts the exhaust gases between the first and second flow paths so that the filtering mechanism can be bypassed when it becomes loaded.

The filter mechanism may have any of many possible forms. In whichever form, the filter mechanism is advantageously bypassed internally or externally of the housing, while utilizing a common acoustic element so that secondary muffler housings are not needed. An internal bypass can be along a path about an outer side of the filtering mechanism or along a path through the filtering mechanism. A path passing through the filtering mechanism in accordance with the present invention advantageously can include a first cylindrical tube fixed with respect to one of the lines leading to the inlet and the outlet of the housing and a second cylindrical tube fitting in sliding, for example circumferential, relationship with respect to the first tube. Both tubes have openings. Preferably, the tubes have openings upstream from the filtering mechanism and downstream from it such that a selected movement, for example, rotation, of the second tube causes a valve action as the openings of the tube move into and out of registration with one another. As will become apparent, exhaust gases either can be directed through the filtering mechanism or can bypass it. With such assembly appropriately controlled regeneration can take place in either forward or reverse directions relative to the flow direction of the exhaust gases. An advantageous tube sit arrangement, involving a slotted tube, is provided.

The present invention provides many conceptual alternatives which lead to more compact and less complex vehicular systems as compared to previously known systems. The various alternatives and advantages are described in detail hereinafter and provide direct reference to the drawings now briefly described.

BRIEF DESCRIPTION OF THE DRAWINGS

FIG. 5 is a cross-sectional view taken along line 5—5 of FIG. 3;

FIG. 6 is a cross-sectional view of a portion of the annular trap of FIG. 3;

FIG. 8 is a cross-sectional detail view of a portion of FIG. 3 of mechanism for mechanically switching the tubular shutter valve assembly between open and closed positions;

FIG. 9 is a cross-sectional detail view of an alternate embodiment of an upstream end of the tubular shutter valve assembly;

FIG. 20 is a cross-sectional view of trap muffler apparatus similar to FIG. 14 except trap segments are mounted on a rotatable carousel for movement to a single regeneration station;

FIG. 21 is a cross-sectional view taken along line 21—21 of FIG. 20;

FIG. 27 is an enlarged fragmentary side cross-sectional view of a muffler apparatus having a core and a bypass valve therein; the arrangement of FIG. 2 depicting an alternate bypass valve in an orientation allowing passage of exhaust gases through the core;

FIG. 28 is a view of the arrangement illustrated in FIG. 27; in FIG. 28 the bypass valve being depicted in a bypass orientation, allowing exhaust gases to bypass the core;

FIG. 29 depicting an alternate embodiment for the bypass valve assembly.

DETAILED DESCRIPTION OF THE PARENT DISCLOSURE

Figure 1:
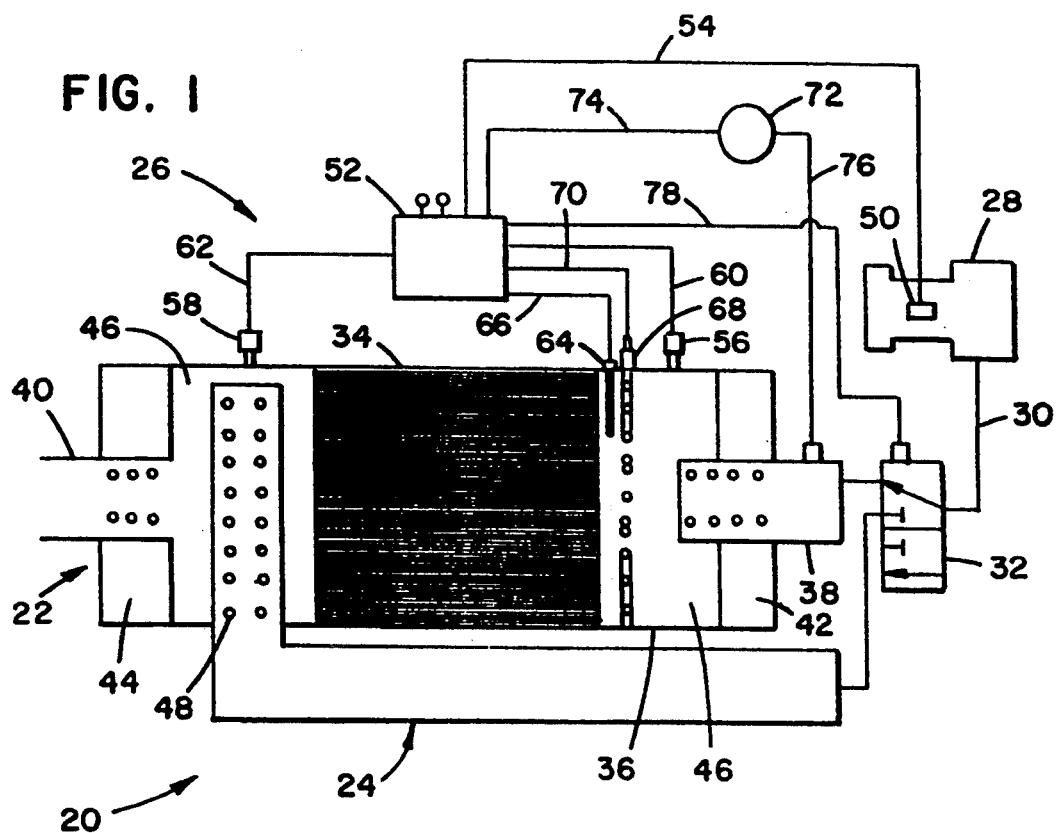
FIG. 1 is a schematic illustration of trap muffler apparatus providing for external bypass of the trap.

FIGS. 1–26 depict the parent disclosure, i.e. U.S. Ser. No. 07/589,050, incorporated herein by reference. Referring now to the drawings wherein like reference numerals designate identical or corresponding parts throughout the several views, and more particularly to FIG. 1, apparatus in accordance with the present invention is designated generally by the numeral 20. Apparatus 20 includes a trap muffler device 22 with an external trap bypass line 24 and regeneration mechanism 26. Engine 28 has exhaust gases which are directed through line 30 to a valve 32. Valve 32 is shown as a four-way, two-position valve, but may be any appropriate valve which provides the proper function. Exhaust gases are directed through trap muffler device 22 until trap 34 is sufficiently loaded with particulates so that unless it is regenerated, it could significantly effect engine performance or cause thermal damage to the filter during subsequent regeneration thereby resulting in trap failure. When that level of loading is determined by regeneration mechanism 26, valve 32 is switched so that exhaust gases are directed through bypass line 24 which bypasses trap 34, but does not bypass at least one of the acoustic elements in trap muffler device 22.

Trap muffler device 22 has a housing 36 with inlet and outlet tubes 38 and 40, respectively. Housing 36 has at least one acoustic element and preferably more than one. In this regard, device 20 in FIG. 1 is shown to have a resonating chamber 42 near the inlet end of housing 36 and a resonating chamber 44 near the outlet end. Trap 34 is mounted in expansion chamber 46 between resonating chambers 42 and 44. Exhaust gases entering housing 36 flow along a first fluid flow path through inlet 38 to expand into resonating chamber 42 and/or expansion chamber 46. The gases then must pass through trap 34 to outlet tube 40. As the gases flow through outlet tube 40, they can expand into resonating chamber 44.

Bypass line 24 is in fluid communication with chamber 46 of housing 36 such that exhaust gases flow thereinto downstream from trap 34, but upstream from at least one acoustic element, namely resonating chamber 44. Thus, when valve 32 is switched so that exhaust gases are directed along a second fluid flow path through tube 24, they do not interfere with the regeneration of trap 34, but sound created by them is muffled without introduction of a second muffler housing since the gases are subjected to at least one acoustic element between the location at which they enter housing 36 and the outlet from it.

Construction of a trap muffler device using a ceramic filter element for the trap is well known to those skilled in the art. Appropriate details may be found in U.S. Pat. No. 4,851,015 which patent disclosure is incorporated herein by reference. Line 24 can be attached to housing 36 in a fashion known to those skilled in the art, such as by providing an opening in the housing wall and welding a tube extending through the opening to the housing wall to prevent leakage. The tube would necessarily include an open end and/or a plurality of smaller openings 48 in the side wall of the tube which is located within housing 36 as shown in FIG. 1.

The term acoustic element is recognized by those skilled in the art to include reactive, passive absorptive, or dissipative attenuation. A reactive acoustic element is understood to mean anything designed to attenuate sound by phase cancellation due to reflection so that one sound wave cancels another by approaching the other (e.g., a resonating chamber). Reactive attenuation is contrasted with passive, absorptive attenuation where amplitude is damped with interaction with another medium. The previous methods are further contrasted with dissipated attenuation (e.g., a labyrinth or an enlarged chamber) wherein sound is decreased primarily by expansion, and not so much by phase cancellation or absorption.

A trap may take any of the following representative forms: ceramic or metallic wall flow filter (e.g., extruded monolith, extruded segmented, paper corrugated and wound monolith, or paper corrugated and wound segmented); ceramic or metallic foam filter (e.g., monolith or segmented); wound ceramic or metallic fiber yarn filter; woven ceramic or metallic yarn filter; woven ceramic or metallic yarn pleated filter; or nonwoven ceramic or metallic pleated paper filter. The FIGURES show and the description is written in terms of using an extruded monolithic ceramic wall flow filter element. As indicated, the other filter forms may be used with change only necessary to the degree known to those skilled in the art. The present ceramic filter element is mounted in a can which is welded or otherwise affixed to housing 36. A ceramic filter of the type useful with respect to the present invention is commercially available from Industrial Ceramics Department, Ceramics Products Division, Corning Glass Works, Corning, N.Y. 14830 or NGK Insulators, Ltd., 2-56 Suda-Cho, Mizuho-ku, Nogoya 467, Japan. In addition, a fuller discussion of the mounting and use of this type of ceramic filter with respect to a regenerative exhaust filtering system may be found in U.S. Pat. No. 4,851,015.

Over time, trap 34 collects an increasing mass of particulates from the exhaust of engine 28. To maintain filtration effectiveness without creating an excessive backpressure to the engine, trap 28 must be periodically regenerated. Regeneration mechanism 26 is shown in FIG. 1. It is understood, however, that the regeneration mechanism could be remote from housing 22 so that trap 34 would be periodically removed and regenerated at a remote site. In this regard, see U.S. Pat. No. 4,899,540 which is herein incorporated by reference.

Referring to regeneration mechanism 26 in FIG. 1, a proper combination of differential pressure or pressure drop across trap 34, air mass flow rate into engine 28, and air temperature near trap 34 results in a factor which is proportional to captured particle mass. The factor is independent of air flow to the engine, engine speed, and exhaust temperature. The factor can be calculated as follows:

$$k = C \frac{\Delta P^x}{Q^y T^z}$$

where k=factor, C=constant, P=pressure drop across trap, Q=air mass flow rate, T=absolute temperature near inlet end of trap, and where x, y, and z have predetermined values in a range from 0.1 to 2.0. Since the factor k increases monotonically with time and does so without great variation, various values of k relate to various weights of accumulated particulate mass accumulated in the trap. Therefore, a mass value and, consequently, a value of k can be chosen as a threshold for initiating regeneration of the trap. Different values of accumulated mass are appropriate for different sizes of ceramic filters as used with various engines and exhaust systems. An appropriate value is readily determinable to those skilled in the art.

The values for pressure drop, air mass flow rate, and absolute temperature near the inlet end of the trap are measured as indicated hereinafter. The values are raised to exponents designated x, y, and z. The exponents have predetermined values which are determinable by those skilled in the art using a least squares or other equivalent method for matching the curve of an equation to empirical data. Similarly, the proportionality constant, C, is determinable by those skilled in the art in a similar fashion. The empirical data is obtained for a particular engine and exhaust system, usually for a particular vehicle.

It is understood that the present method for determining when to regenerate the trap is representative and that other methods may as well be used. A fuller discussion of the present method is provided in U.S. patent application Ser. No. 07/399,859 filed Aug. 29, 1989, which is incorporated herein by reference.

With further reference to FIG. 1 and the method described hereinbefore, air mass flow rate is measured by a sensor 50 near the air intake to engine 28. The sensed measurement is communicated to processor unit 52 via line 54. Sensor 50 is a type known to those skilled in the art, such as a hot-wire probe or a Venturi style flow meter. Pressure sensors 56 and 58 measure pressure upstream and downstream of trap 34 so that a pressure drop can be obtained. Sensors 56 and 58 communicate necessary information to processor unit 52 via lines 60 and 62, respectively. Temperature at the upstream face of trap 34 is measured by thermocouple 64 which communicates with processor unit 52 via line 66. At the appropriate time based on the calculation of factor k, heating element 68 is turned on via line 70. Combustion air is provided by source 72 as controlled via line 74 with air directed upstream of trap 34 via line 76. At a time preferably before heating element 68 is turned on, valve 32 is switched via line 78 to direct the exhaust gases to bypass trap 34. After a flame front has been initiated during regeneration, heating element 68 is turned off. When the flame front completely burns accumulated particulates from one end of trap 34 to the other, combustion air is turned off and valve 32 is again switched so that exhaust gases are again directed through trap 34 rather than bypassing it.

Figure 1A:
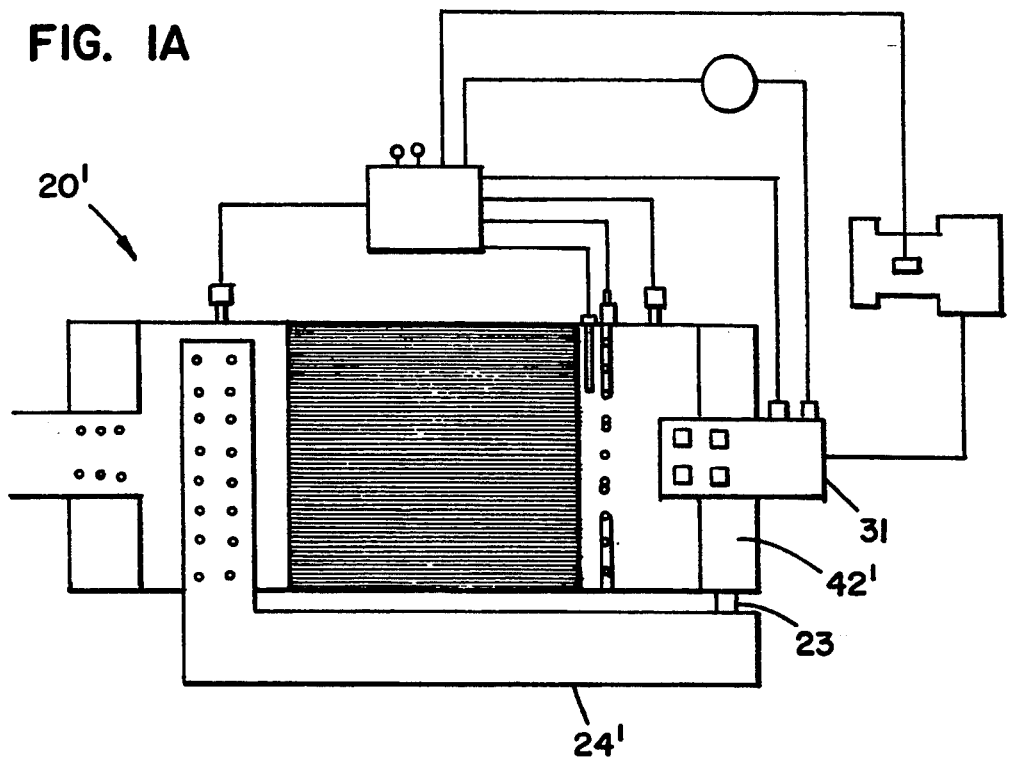
FIG. 1A is an alternate embodiment of apparatus shown in FIG. 1.

An alternate embodiment trap muffler apparatus 20' with external bypass is shown in FIG. 1A. Apparatus 20' is the same as apparatus 20 except valve 31 is a tubular valve assembly of a type apparent from discussion hereafter instead of a four-way, two-position valve 32, and bypass line 24' is connected via pipe 23 to resonating chamber 42' instead of being connected to the four-way, two-position valve 32.

Figure 2:
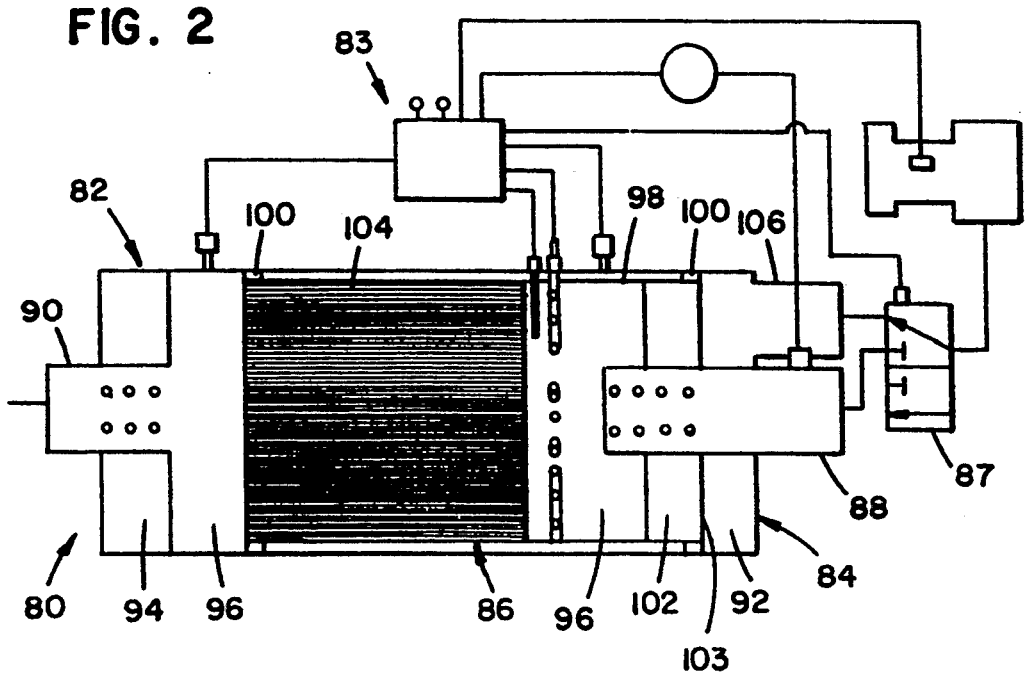
FIG. 2 is a schematic illustration of trap muffler apparatus providing for internal bypass of the trap.

Trap muffler apparatus having an internal bypass in accordance with the present invention is shown in FIG. 2. Apparatus 80 includes a trap muffler device 82 with regeneration mechanism 83. Regeneration mechanism 83 is the same as regeneration mechanism 26 of apparatus 20 in FIG. 1. Trap muffler device 82 has a housing 84 with an inner canister 86. Housing 84 includes an inlet 88 connected with a first fluid communication line leading to the engine and an outlet 90 connected to a second fluid communication line leading to atmosphere. Housing 84 has a plenum chamber 92 near the inlet end and a resonating chamber 94 near the outlet end. Chamber 96 is formed between chambers 92 and 94 and contains inner canister 86. Inner canister 86 has a solid wall 98 and is held spaced from the outer solid wall of housing 84 by a spider or spacer brackets 100 near the opposite ends of inner canister 86. Inner canister 86 includes a resonating chamber 102 near the inlet end.

Trap 104 is fixed to inner canister 86 and located between resonating chambers 102 and 94. The ceramic element of trap 104 has upstream and downstream faces. Exhaust gases from the engine are directed through input 88 which bypasses plenum chamber 92 and opens into resonating chamber 102 and expansion chamber 96. After passing through trap 104, the exhaust gases exhaust through outlet 90 which opens into resonating chamber 94, before leading to atmosphere. When trap 104 requires regeneration, the valve is switched so that the exhaust gases are directed to bypass inlet 106 leading to plenum chamber 92 which is in fluid communication with an annular space between the walls of housing 84 and inner canister 86. The annular space opens into chamber 96 downstream from trap 104 so that the exhaust gases may flow through output 90 while having the benefit of the sound muffling of resonating chamber 94. Thus, apparatus 80 provides for bypass of trap 104, and does so by directing the exhaust gases into housing 84 to bypass the upstream face of the ceramic element and flow in a flow enclosure between housing 84 and the side of the ceramic element, as opposed to apparatus 20 where the exhaust gases are directed into housing 36 downstream from trap 34. Each system has advantages. For example, housing 36 of apparatus 20 can have a smaller diameter with bypass tube 24 taking on whatever shape is necessary to package the system relative to a particular vehicle. Apparatus 80 has a larger relative diameter than apparatus 20, but trap 104 can be affixed by those skilled in the art to wall 98 of inner canister 86 so that the bypassed exhaust gases provide a peripheral heating for the ceramic filter of trap 104. In this way, regeneration may be enhanced since the heating element need not provide all the energy to ignite a flame front. Furthermore, there would be less likelihood of heat loss around the periphery so that the flame front can burn farther through the ceramic filter and more evenly thereby reducing thermal stress.

Figure 19:
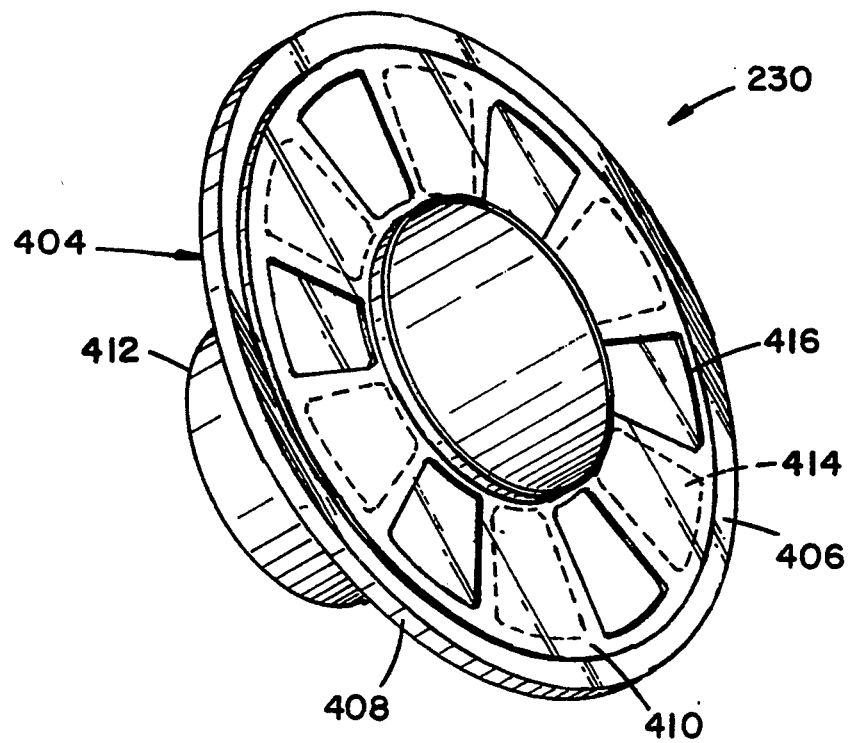
FIG. 19 is a perspective view of a disk shutter valve of the type useful in the apparatus of FIG. 12.

Although not shown in FIG. 2, it is noted that valve 87 could be replaced with a disk shutter valve similar to that shown in FIG. 19 by replacing end wall 103 of inner canister 86 with the disk shutter valve. It is also noted that the acoustic elements need not be a part of the housing, but may be formed in the tubes upstream or downstream of the housing which direct the exhaust gases to the housing, such acoustic attenuation apparatus being disclosed in U.S. patent application Ser. No. 07/260,818, filed Oct. 21, 1988, herein incorporated by reference.

Figure 2A:
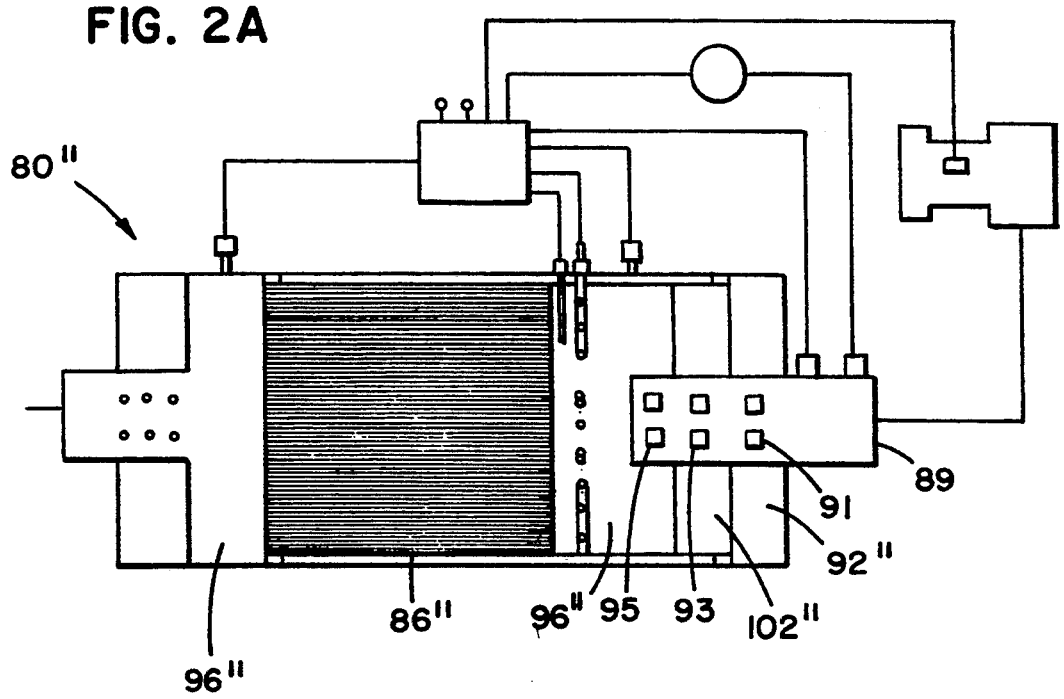
FIG. 2A is an alternate embodiment of apparatus shown in FIG. 2.

An alternate embodiment of apparatus 80 is shown in FIG. 2A as trap muffler apparatus 80". Apparatus 80" is similar to apparatus 80 except valve 87 and bypass inlet 106 are replaced by a tubular valve assembly 89 apparent in detail from disclosure hereinafter. Valve assembly 89 in combination with the structure previously disclosed in FIG. 2 would preferably have three sets of openings 91, 93, and 95. When openings 93 and 95 are in registration in the fashion of a tubular valve assembly as disclosed hereinafter, exhaust gases would flow into resonating chamber 102" and expansion chamber 96" for appropriate sound attenuation and filtering. When openings 93 and 95 are closed for flow and openings 91 are in registration, exhaust gases would flow into plenum chamber 92" in order to bypass trap 86".

Another embodiment of trap muffler apparatus with internal bypass in accordance with the present invention is shown in FIGS. 3–9. Apparatus 108 in FIGS. 3 and 4 has a trap muffler device 110 with regeneration mechanism 112. Regeneration mechanism 112 is the same as that described with respect to apparatus 20 in FIG. 1 and does not need further explanation. Trap muffler device 110 has a housing 114 with an outer cylindrical wall 116 and end baffles 118 and 120 and an interior baffle 122. The baffles forming walls extend generally transversely relative to said cylindrical wall. Baffles 118 and 120 provide end closures for cylindrical wall 116. Interior baffle 122 provides a wall such that a resonating chamber 124 is formed between baffles 120 and 122. Each of baffles 118 and 120 are formed to have portions of tubes 126 and 128, respectively, extending outwardly. Tube 126 provides input from the engine to trap muffler device 110 and tube 128 provides output. Trap 130 is mounted in chamber 132 formed between baffles 118 and 122. Trap 130 is annular with a cross-sectional shape in the form of a ring in order to receive a portion of a tubular shutter valve assembly 134 through the center.

Figure 7:
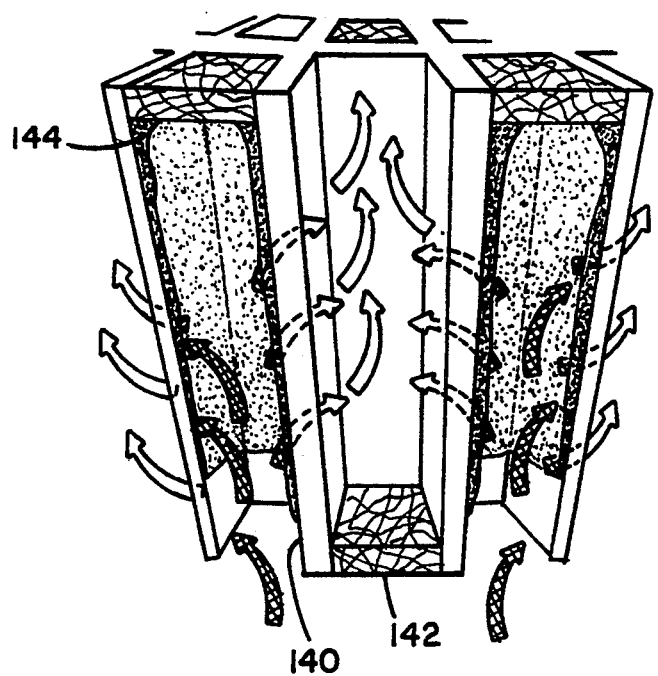
FIG. 7 is an illustration of a trap loading with particulates.

Trap 130 is shown in more detail in FIGS. 5 and 6. Trap 130 includes an annular shaped ceramic element 136. An annular shaped filter as opposed to a cylindrical or other uniform cross-sectional shape, may result in more uniform velocity of flow-through and more uniform loading. As indicated earlier, a ceramic element is commercially available and preferably is an extruded ceramic which is fired so that the primary crystalline component is cordierite. With respect to element 136, parallel channels 138 run the full length of the element. The walls 140 of channels 138 are porous thereby allowing them to function as filter media. Opposite ends of adjacent channels are plugged with a ceramic material 142. This forces exhaust gases as illustrated in FIG. 7 through walls 140 so that soot 144 is collected on the walls. Heat resistant material 144 provides both an intumescent, cushioning function and a fire retardant, heat resisting barrier between element 136 and surrounding walls. Material 144 is wrapped about the outside wall of element 136 and also about the inside wall. The ends of material 144 are spaced from the ends of element 136 so that a sealing material 146, such as a compressible braided rope of fiberglass, may be fitted therein. Interior and exterior metallic walls 148 and 150 retain material 144 in place and have ends turned over element 136 so as to compress sealing material 146 and hold all parts together to form a modular trap. Trap 130 is welded or otherwise affixed to wall 116 of housing 114. U.S. Pat. No. 4,851,015 provides a fuller discussion of creating a trap module, although the present disclosure is the first to recognize advantages from using an annular trap.

The tubular shutter valve assembly 134 provides a mechanism for directing exhaust gases through trap 130 or directing the exhaust gases to bypass trap 130. Assembly 134 includes an outer cylindrical tube 152 and an inner cylindrical tube 154. Outer tube 152 has the same inner diameter as outlet tube 128 and extends from spider bracket 156 which is attached to wall 116 of housing 114, to a distance spaced upstream from the upstream end of trap 130. The upstream end of outer tube 152 is closed with a cover 158. Outer tube 152 is supported by spider bracket 156 and annular trap 130.

Inner tube 154 extends from inside outlet tube 128 to near cover 158. Inner tube 154 has an outer diameter which is slightly less than the inner diameter of outer tube 152. A precision relationship between the diameters of the tubes helps to reduce leakage. A certain amount of leakage, however, is acceptable since leakage will only cause a slightly increased demand for combustion air during regeneration or a slightly reduced trap collection efficiency.

Inner tube 154 is supported by outlet tube 128 and outer tube 152. Inner tube 154 is not attached to but has a sliding relationship with baffle 122. Inner tube 154 has a plurality of openings 160 in the region where inner tube 154 is contained within resonating chamber 124. Openings 160 allow exhaust gases to expand into the resonating chamber for the purpose of muffling sound.

Figure 3:
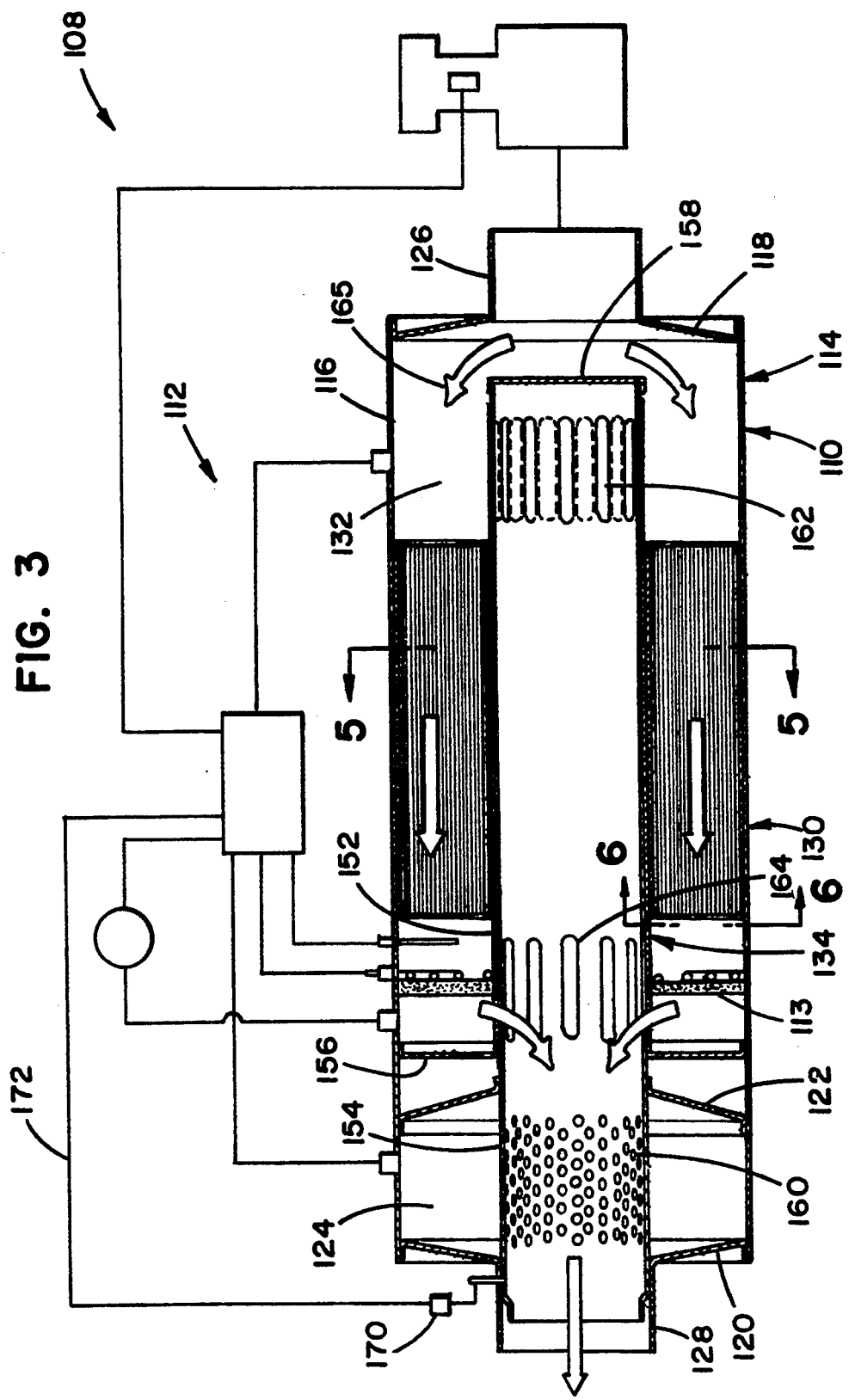
FIG. 3 is a cross-sectional view of trap muffler apparatus with an annular trap and an axial tubular shutter valve assembly with a schematic representation of regeneration mechanism in accordance with the present invention.

Each of inner and outer tubes 152 and 154 have upstream and downstream sets of elongated openings 162 and 164, respectively, to form upstream and downstream valves relative to the ceramic filter element. That is, the openings are regularly spaced about the periphery of each tube with each opening spaced from an adjacent opening sufficiently far so that inner tube 154 can be rotated to cause the openings to move into and out of registration with the openings in outer tube 152. In addition, the openings are arranged so that if openings 162 are out of registration, openings 164 are in registration and vice versa. In this way, when openings 162 are out of registration with one another, as shown in FIG. 3, exhaust gases (see arrows 165) are directed through trap 130 and openings 164 for exhaust past resonating chamber 124 to outlet tube 128. When openings 162 are in registration within one another, so that openings 164 are out of registration with one another, exhaust gases (see arrows 167) are directed through openings 162 and for a reason to be further discussed hereinafter, the exhaust gases bypass trap 130, to flow past chamber 124 to outlet tube 128. Each set of openings 162 and 164 should provide a flow-through area at least as great as the cross-sectional area of inner tube 154 so that recognizing the openings will still cause some restriction, it will not be an excessive or undue restriction.

As shown in FIG. 8, the moving mechanism for inner tube 154 with respect to outer tube 152 and outlet tube 128, includes a slot 166 in outlet tube 128 through which a lever 168 which is attached to inner tube 154 protrudes. An actuator 170, such as an electrical solenoid, is attached to lever 168 and is controlled via line 172 leading to the microprocessor or other control mechanism. When lever 168 is moved circumferentially one way or the other, tube 154 rotates appropriately to achieve the alignment or misalignment of openings 162 and 164 as previously discussed. The outlet end 174 of inner tube 154 has a taper 176 so that as the exhaust gases flow to atmosphere any leakage through slot 166 is aspirated through the taper from outside to inside.

As shown in FIG. 9, a relief valve 178 may be installed in cover 158 so that if regeneration fails so that the trap remains loaded, the relief valve can open as exhaust pressure builds, thereby avoiding damage to the engine. Also, when trap 130 approaches its loaded condition just prior to regeneration, any pressurizing surge of exhaust gases may be relieved to bypass filter 130. Relief valve 178 is depicted as a tapered plunger 180 biased with a spring 182 against a bracket 184 fastened to cover 158.

As indicated previously, when the particulate soot cake has accumulated to satisfy the logic of the regeneration system so that it is determined that regeneration of the ceramic filter element is necessary, the regeneration process begins. Apparatus 20 and apparatus 80 in FIGS. 1 and 2 show forward regeneration. That is, the heater is on the upstream side of the ceramic filter element so that particulates are ignited initially at the upstream end and the flame front burns toward the downstream end. U.S. Pat. No. 4,851,015 and U.S. patent application Ser. No. 07/399,859 disclose forward flow regeneration in detail.

Figure 4:
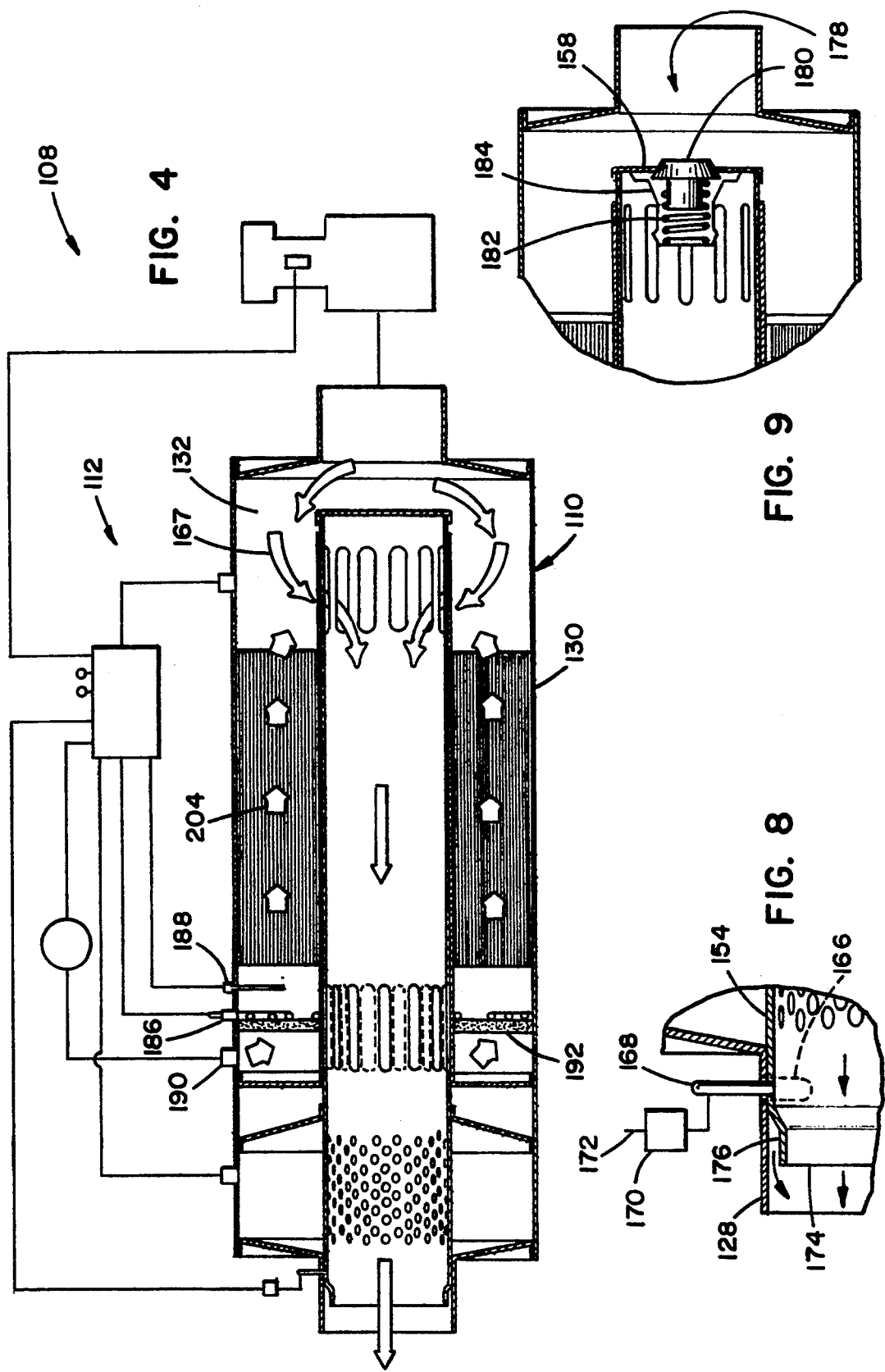
FIG. 4 shows the same apparatus as FIG. 3 with arrows illustrating reverse regeneration and exhaust gas bypass of the trap.
Figure 18:
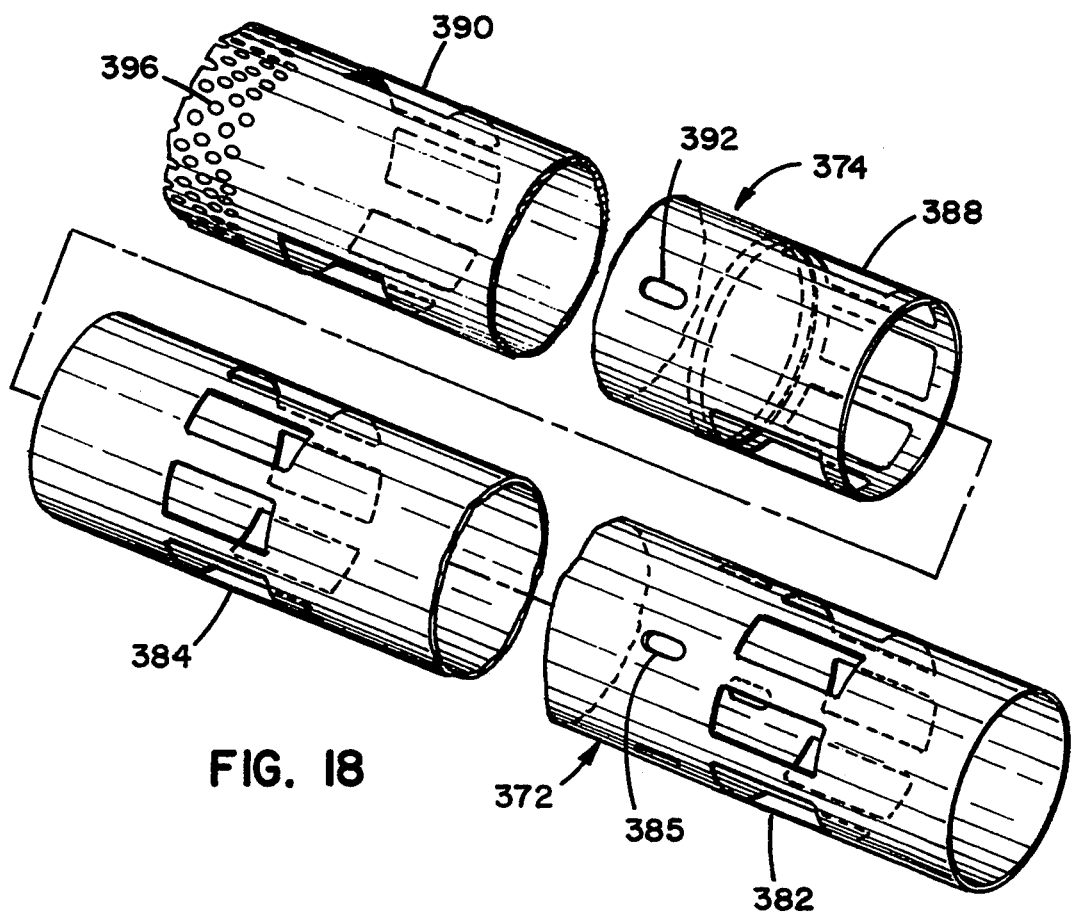
FIG. 18 is an exploded perspective view of the tubular shutter valve assembly of the apparatus of FIG. 17.

Apparatus 108 in FIGS. 3 and 4 show regeneration mechanism 112 configured for reverse flow, that is, flow in a direction opposite to the flow of the exhaust gases through the ceramic filter element. Although the apparatus shown in FIGS. 3-4 show an acoustic element other than the expansion space in the chamber in which the trap is located, it is understood that such acoustic element is not necessary for the filtration and regeneration functions. With reference to FIG. 4, in a reverse regeneration configuration, heating element 186 is positioned between the downstream end of trap 130 and baffle 122. Thermocouple 188 is in the region between heating element 186 and the downstream end of trap 130. Combustion air is inserted into chamber 132 at a tube 190 in a region downstream from heating element 186. If a heat reverser element 192 is used, as shown in FIGS. 3 and 4, it is positioned between heating element 186 and combustion air entry tube 190. In a reverse regeneration configuration, the heating reverser is advantageously on the clean side of trap 130 so that it is unlikely to capture particulates or debris and, therefore, not become an exclusive restriction to flow. The function of heating reverser 192 is disclosed in greater detail in U.S. Pat. No. 4,878,928, herein incorporated by reference. It is noted that although heating reverser 192 is preferable, it is not needed. Regeneration mechanism 112 is otherwise the same as regeneration mechanism 26 and can be triggered by monitoring a factor k as described adequately hereinbefore. In this regard, it is further noted, however, that some other triggering logic may as well be used.

Figure 10:
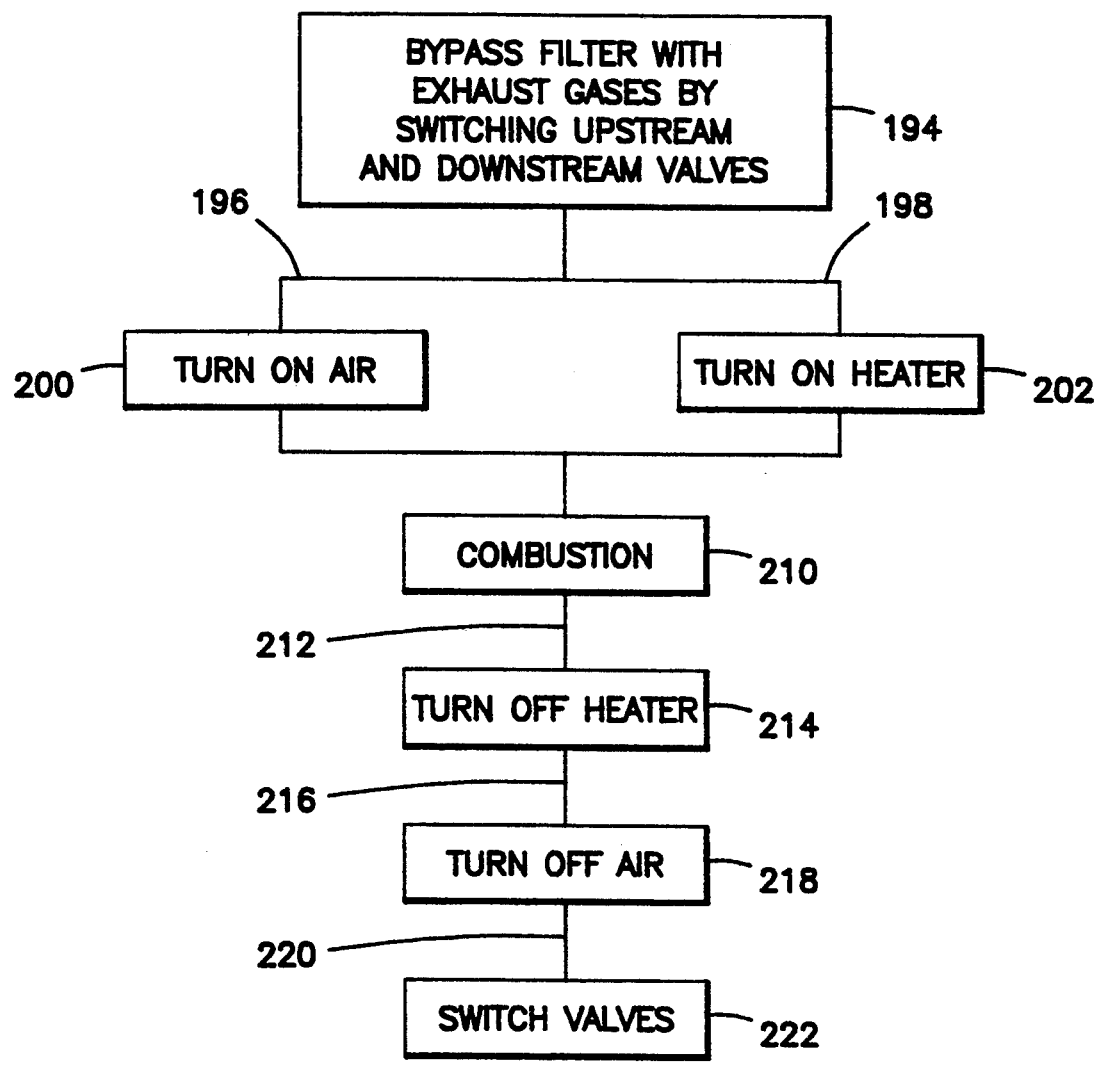
FIG. 10 is a flow chart illustrating a method of regenerating trap muffler apparatus having valves upstream and downstream of a trap.

In use, as depicted in the flow chart of FIG. 10, once it is determined that regeneration is necessary, as indicated in box 194, the upstream and downstream valves as represented by sets of openings 162 and 164 are switched so that exhaust gases 167 are directed to bypass trap 130. Then, as indicated by lines 196 and 198 leading to boxes 200 and 202, combustion air and the heating element are turned on. One may be turned on before the other. A flame front will not be ignited, however, until the pressure of combustion air builds sufficiently to flow as indicated by arrows 204 in a reverse direction against incoming exhaust gases 167. Both remain on as indicated by lines 206 and 208 leading to box 210, until combustion occurs. As indicated by line 212 leading to box 214, the heater is turned off sometime after combustion begins as may be sensed by the thermocouple. After combustion has been completed, as indicated by line 216 leading to box 218, combustion air is turned off. As indicated by line 220 leading to box 222, the valves are then switched so that exhaust gases 165 once again are directed through trap 130 as indicated in FIG. 3.

Several advantages are realized with reverse regeneration relative to forward regeneration. Consider first forward regeneration. The heater as shown in FIGS. 1 and 2 is nearest the lightest deposits of particulates on the filter (see FIG. 7). As the flame burns in a forward direction along the filter element, combustion air can pass through the filter walls before getting to the flame and, consequently, not only is the combustion air less accessible to combustion, but it also tends to cool the walls upstream of the flame. The combustion air that reaches the flame drives heat into the wall. consequence, a fairly high heat gradient between the region where the flame has burned and the region where the flame is burning can be developed. If the flame prematurely quenches, the heaviest deposits at the downstream end remain. Thus, the heater must heat the upstream end sufficiently to ignite the lightest deposit and if the flame quenches prematurely, the greatest deposits remain.

Consider now reverse regeneration. The heater is located at the downstream or clean side of the trap. The heater is nearest the heaviest deposits of particulates. Combustion air is more available for combustion since after passing through the filter wall, it flows toward particulate deposits. Rather than driving heat into the wall, it takes heat away from the wall. The thermal gradient is less than in the case of forward regeneration and the consequent tendency to crack the ceramic is reduced. The thickest deposits are burned first so that over heating is much less likely particularly in view of the combustion air tending to move heat away from the filter walls. If the flame front is quenched, the lightest deposits remain rather than the heavier deposits. Compared to the forward regeneration situation, the filter begins the next cycle at a lower level of remaining particulates which allows for lower pressure drops across the trap and lower temperatures during regeneration, all of which further leads to lower cracking tendency. If any ash is dislodged from the walls of the trap by shock or vibration or combustion air, it tends to be removed from the apparatus through the bypass flow path, something not possible with forward regeneration since dislodged ash cannot move against the air flow or through the ceramic walls. Thus, for the reasons given, reverse regeneration results in many advantages.

Figure 11:
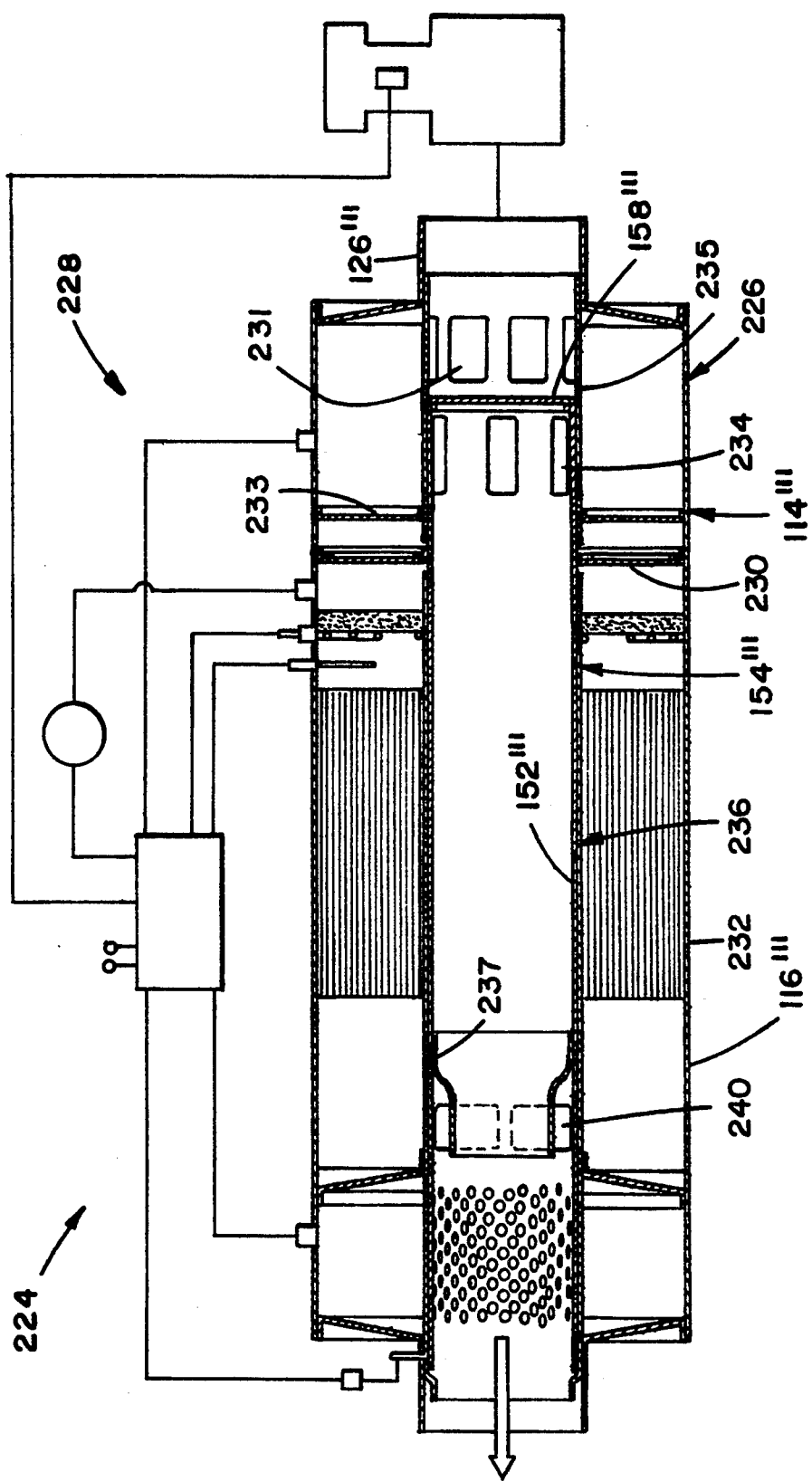
FIG. 11 is a cross-sectional view of trap muffler apparatus similar to FIGS. 3 and 4 except showing structure for forward flow regeneration.

Nevertheless, a forward regeneration configuration is also possible with apparatus using the tubular shutter valve assembly as shown in FIG. 11. Apparatus 224 includes trap muffler device 226 with regeneration mechanism 228. Regeneration mechanism 228 is the same as regeneration mechanism 26 of FIG. 1. Trap muffler device is the same as trap muffler device 110 of FIG. 3, except disk shutter valve 230 is provided between trap 232 and upstream openings 234 of tubular shutter valve assembly 236 and openings 240 are formed so that they are always open regardless of whether openings 234 are open or closed. Depending on the particular construction of disk shutter valve 230, tubular shutter valve assembly 236 may or may not be formed at the upstream end similar to that described with respect to FIGS. 3 and 4. In fact, in FIG. 11, disk shutter valve 230 is attached to inner tube 152''' while outer tube 154''' is not attached to the disk valve. Outer tube 154''' includes an upstream portion 235 which is supported by a spider 233 and inlet tube 126'''. Spider 233 extends between portion 235 and wall 116'''. Portion 235 includes openings 231 which are inside housing 114''' and upstream of cover 158''' and are always open and which also includes openings 234 which are available to be opened or closed as inner tube 152'''is appropriately moved.

The thermocouple, heating element, heating reverser, and combustion air inlet of regeneration mechanism 228 are located between disk shutter valve 230 and trap 232. Regeneration mechanism 228 functions shutter valve 230 in conjunction with tubular valve assembly 236. That is, when upstream openings 234 are closed, disk shutter valve 230 is open and downstream openings 240 are open so that exhaust gases are directed through openings 231 and trap 236 and out downstream openings 240. When upstream openings 234 are open, disk shutter valve 230 is closed so that exhaust gases are directed to bypass trap 232 and trap 232 can be regenerated. Openings 240 remain open so that combustion gases which are pressurized to a level greater than engine exhaust gases can exhaust. It is noted that a Venturi nozzle 237 can be provided in the inner tube of tubular valve assembly 236 which begins upstream from openings 238 and ends downstream from openings 238 so that regeneration combustion gases are aspirated and the pressure of combustion air need not be greater than the exhaust gases pressure during regeneration. The benefits of the nozzle, however, must be considered relative to the additional load due to back pressure placed on the engine.

Disk shutter valve 230 is shown in detail in FIG. 19. Disk shutter valve 230 includes a body 404 comprised either integrally or of separate elements affixed together in the form of a first annular disk portion 406 having an outer flange 408 and an inner tubular flange (not shown since it is behind the disk in FIG. 19). A second annular disk portion 410 cooperates with first portion 406 and is fitted within a groove in outer flange 408. Second annular disk portion 410 is attached at its inner diameter to tubular portion 412. Tubular portion 412 has the same diameter as and becomes a part of inner tube 152''' as shown in FIG. 11. Disk portion 406 is a solid sheet extending between the inner tubular flange (not shown) and flange 408 except for regularly spaced openings 414. Openings 414 are spaced sufficiently far so that similarly sized openings 416 can be closed when second disk portion 414 is rotated so as to move the two sets of openings out of registration with one another. Flange 408 has an outer diameter only slightly smaller than the inner diameter of wall 116''' of housing 114''' to which it is affixed by weld or other method known to those skilled.

The trap muffler apparatuses discussed hereinbefore provide for bypass during regeneration which totally bypasses any filtering capability. Such apparatuses may not be acceptable in some applications with particularly "dirty" engines, or sensitive applications such as city buses, which may include all currently available diesel engines, since soot plumes would occur during the regeneration cycle. To overcome this problem, a plurality of in-line traps can be used as disclosed hereinafter.

Figure 12:
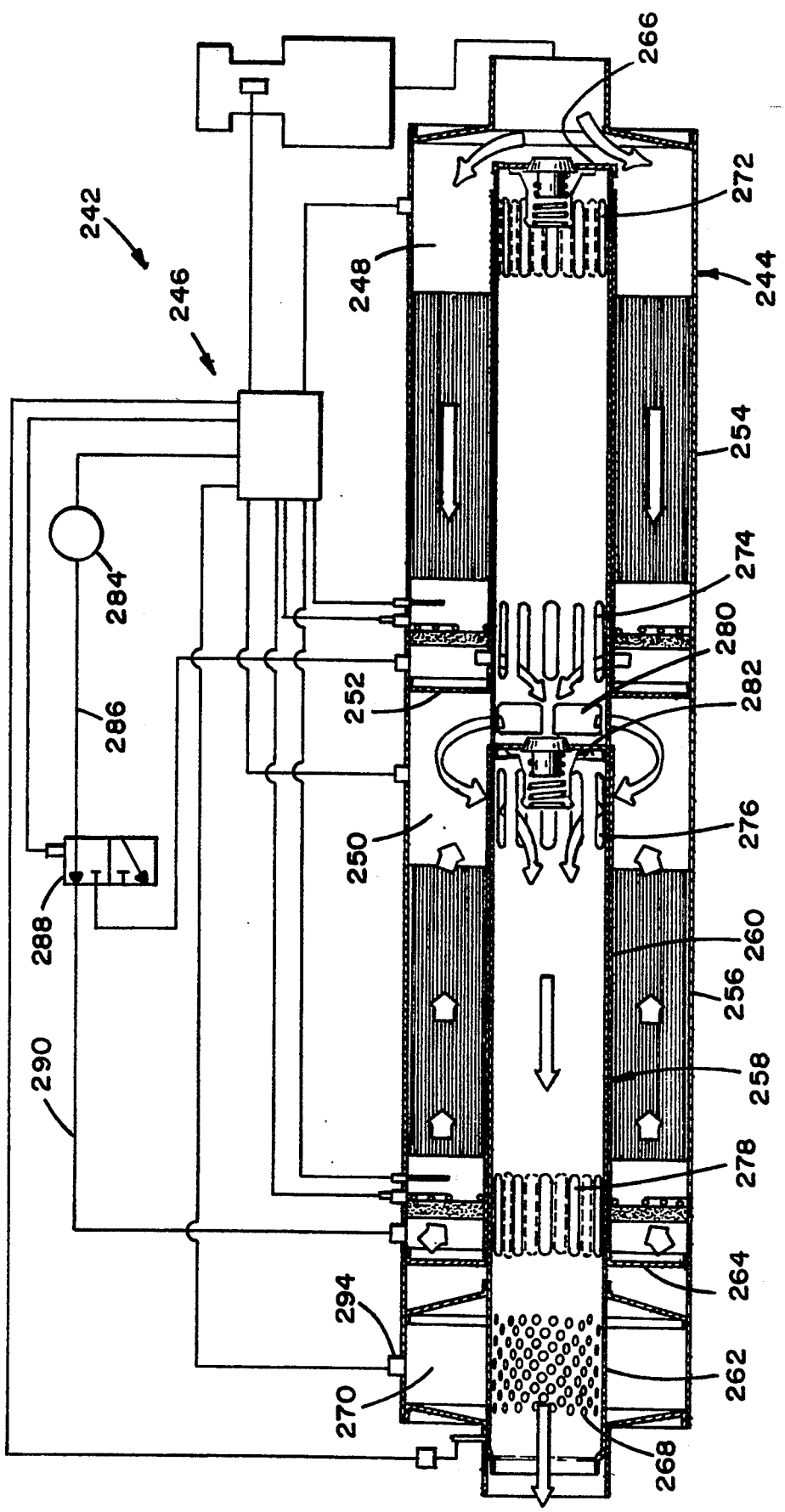
FIG. 12 is a schematic illustration of trap muffler apparatus similar to FIGS. 3 and 4 except showing a plurality of in line traps.
Figure 13:
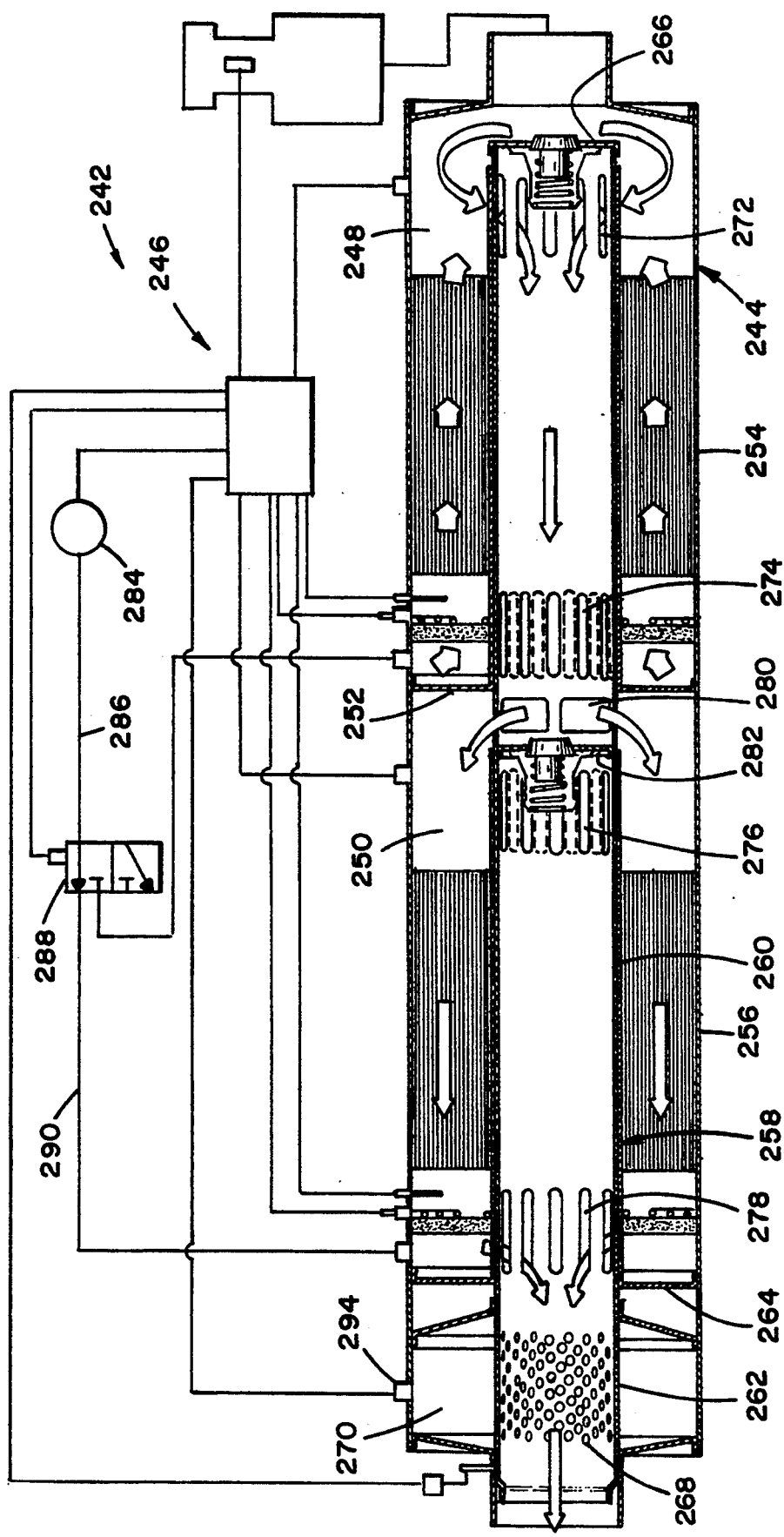
FIG. 13 is a schematic illustration similar to FIG. 12 with the tubular shutter valve assembly switched opposite from its configuration in FIG. 12.

As shown in FIGS. 12–13, apparatus 242 has a trap muffler device 244 with a regeneration mechanism 246. Trap muffler device 244 has a housing in the fashion of housing 116 of apparatus 108 in FIG. 3, except it has first and second expansion chambers 248 and 250. The expansion chambers are separated by a baffle 252. A first trap 254 is installed in expansion chamber 248, and a second trap 256 is installed in expansion chamber 250. Tubular shutter valve assembly 258 has an outer cylindrical tube 260 and an inner cylindrical tube 262 as described with respect to previous such assemblies. Outer tube 260 extends from spider bracket 264 downstream from second trap 256 to a distance spaced upstream from first trap 254. Spider bracket 264 is attached to the outer wall of the housing of trap muffler device 244. Outer tube 260 is supported by spider bracket 264, baffle 252, and first and second traps 254 and 256.

Inner tube 262 extends from inside the outlet tube of trap muffler device 244 to a distance slightly beyond the upstream end of outer tube 260. The upstream end of inner tube 262 is closed with a cover 266. Alternatively, the outer tube could extend further than the inner tube and the cover could be on the outer tube as described with respect to assembly 134 in FIG. 3. Inner tube 262 is supported by the outlet tube of trap muffler device 244 and outer tube 260. Inner tube 262 has a plurality of openings 268 in the region where inner tube 262 extends through resonating chamber 270. Each of inner and outer tubes 262 and 260 have upstream and downstream sets of elongated openings with respect to each of first and second traps 254 and 256. Upstream openings 272 form an upstream valve relative to first trap 254 while second set of openings 274 form a downstream valve. Similarly, upstream openings 276 form an upstream valve relative to second trap 256 while second set of openings 278 form a downstream valve. An always open set of openings 280 are located between openings 274 and 276. Baffle 252 is located relative to outer tube 260 in a region between openings 274 and 280. A wall completely blocking inner tube 262 is located between openings 280 and 276. The various sets of upstream and downstream openings are constructed and function similar to the upstream and downstream openings 162 and 164 described with respect to tubular shutter valve assembly 134 in FIG. 3. The sets of openings which function with respect to trap 254 function opposite the sets of openings which operate relative to trap 256. Openings 280 are always open and allow exhaust gases to escape since wall 282 prevents the exhaust gases from continuing to flow through inner tube 262. Thus, when openings 272 are closed as shown in FIG. 12, exhaust gases are directed through trap 254 and into inner tube 262 since openings 274 are open. The exhaust gases then flow out of openings 280 and into openings 276 since they are open. The exhaust gases are then directed past openings 268 leading to resonating chamber 270 then exhausted from trap muffler device 244. In this way, exhaust gases may be filtered by trap 254 as described with respect to apparatus 108 in FIG. 3, while trap 256 may be regenerated as described with respect to apparatus 108 in FIG. 4. When inner tube 262 is rotated so that opened openings 274 and 276 are closed and closed openings 272 and 278 are opened, then trap 254 can be regenerated while trap 256 filters exhaust gases, as shown in FIG. 13. Tubular valve assembly 258 is functioned in a fashion similar to that disclosed with respect to apparatus 108 with reference to FIG. 8.

Regeneration mechanism 246 is the same as regeneration mechanism 112, except that it is a dual system having similar components for both of traps 254 and 256. In this regard, depending on which trap is being regenerated, air source 284 directs air via line 286 to valve 288. If trap 256 is to be regenerated, valve 288 is open to allow combustion air to flow via line 290 to expansion chamber 250 as indicated in FIG. 12. If trap 254 is to be regenerated, valve 288 is open to expansion chamber 248 to direct air via line 292 to expansion chamber 248. The only other difference of note is that pressure differentials with respect to each trap are compared to a single measurement of pressure as obtained from pressure sensing device 294 in resonating chamber 270.

Figure 14:
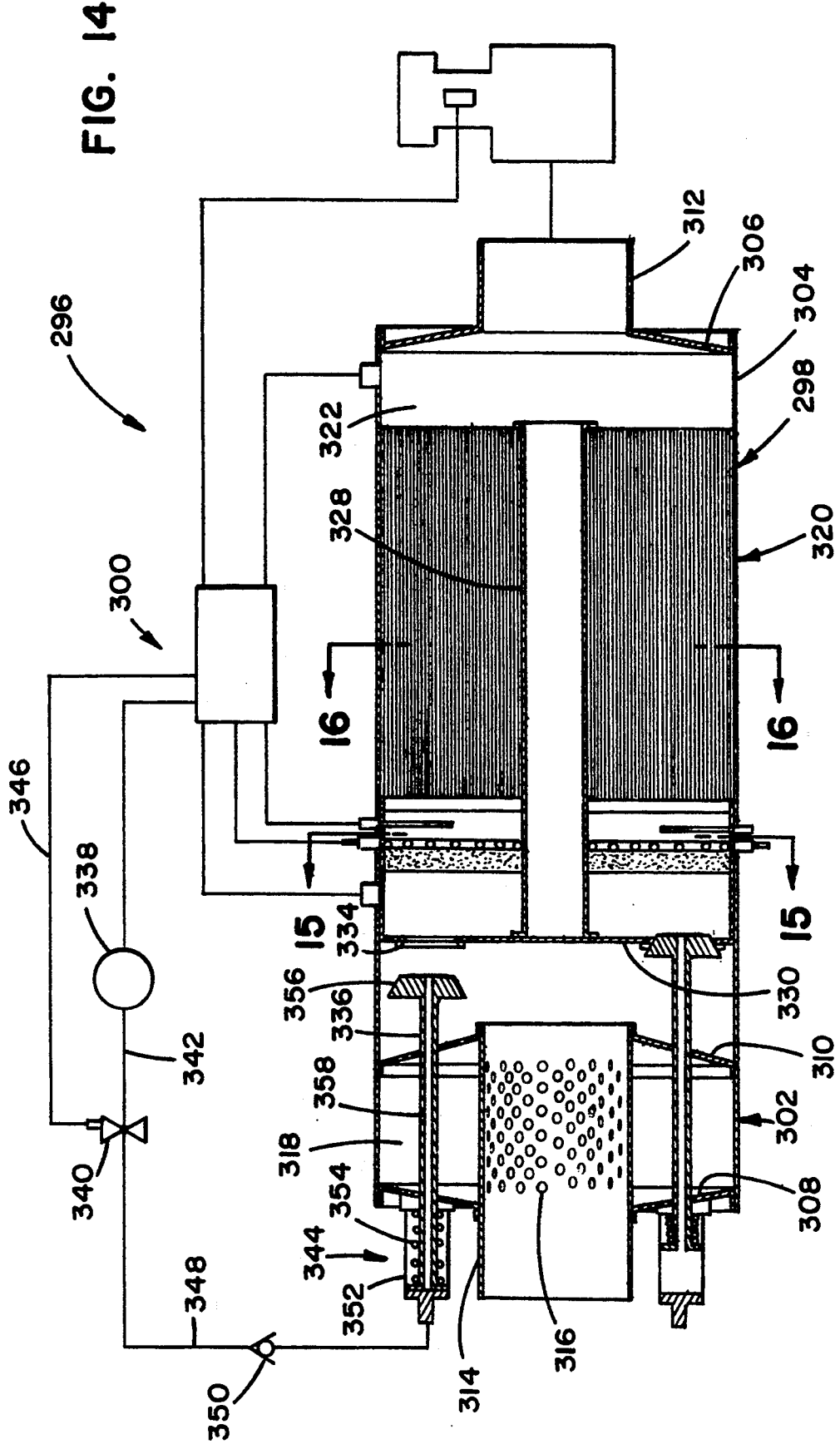
FIG. 14 is a cross-sectional view of a trap muffler apparatus similar to FIGS. 3 and 4 except having a segmented trap and downstream poppet valves used in the regeneration system.

Another embodiment of trap muffler apparatus with internal bypass which includes a plurality of traps so that exhaust gases are not bypassed to atmosphere without filtering, is shown in FIG. 14. Apparatus 296 includes a trap muffler device 298 with regeneration mechanism 300. Trap muffler device 298 includes a housing 302 having a wall 304 with end baffles 306 and 308 and an interior baffle 310. The baffles are formed and fastened to wall 304 as known to those skilled in the art. Baffle 306 includes a tube 312 extending outwardly which is in fluid communication with the engine to receive exhaust gases therefrom. An outlet tube 314 is supported by and fastened to baffles 308 and 310. Outlet tube 314 has a plurality of openings 316 which allow expansion of exhaust gases into resonating chamber 318 formed between baffles 308 and 310. Trap assembly 320 is installed in expansion chamber 322 formed between baffles 306 and 310. Trap assembly 320 includes a plurality of traps and regeneration assemblies so that one trap may be regenerated while the others continue to filter exhaust gases. As discussed more fully hereinafter, the ceramic filters of each trap are segments of an annular filter or may have some other shape. Exhaust gases and combustion air are controlled with poppet valves with respect to each trap.

Figure 16:
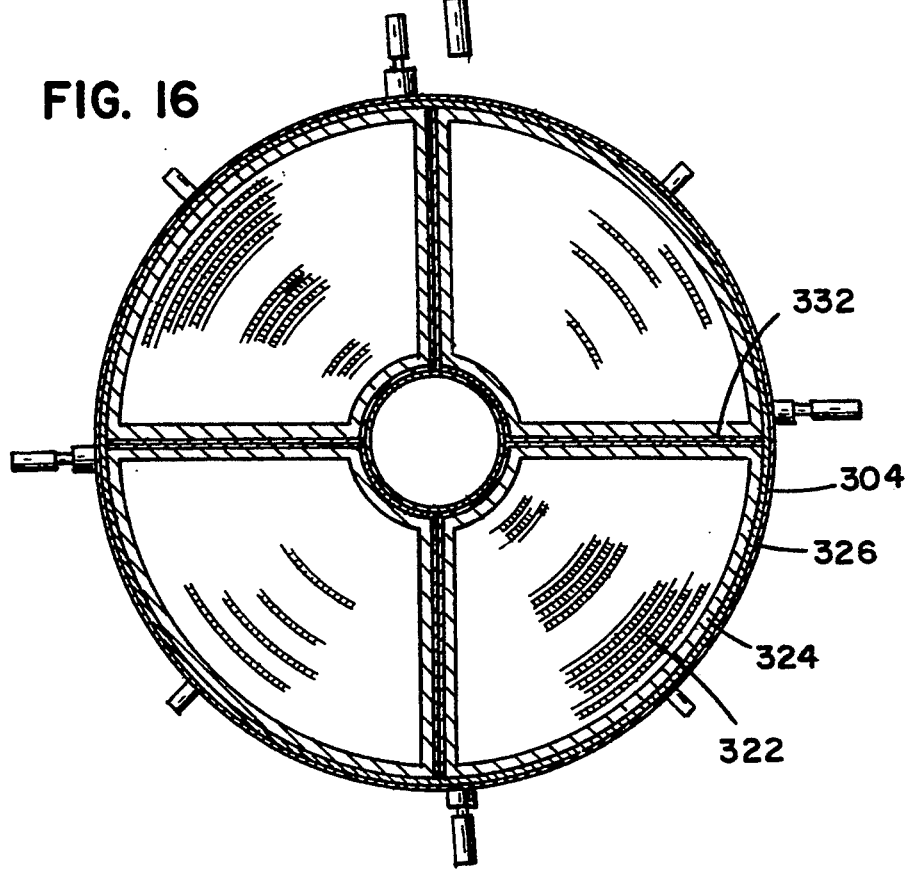
FIG. 16 is a cross-sectional view taken along line 16—16 of FIG. 14.

Trap assembly 320 has four identical filter elements 322 as shown in FIG. 16. Each element is wrapped in a heat resistant material 324 which is the same as material 144 described earlier. The various elements 322 are contained within a common container 326 which is formed to support them at upstream and downstream ends with collars (not shown) extending inwardly from canister 326 and outwardly from core rod 328. A sealing material (not shown) the same as material 146 is also used between material 324 and the various collars. Canister 326 is tack welded or otherwise affixed to wall 304 of housing 302. Core rod 328 extends from the upstream end of trap 320 to a baffle 330 located between the downstream end of trap 320 and baffle 310. Walls 332 which provide a flow barrier between the various traps extend from the upstream end of trap 320 to baffle 330. Baffle 330 has a plurality of tapered openings 334 for receiving poppet pistons 336. For normal flow, the valves formed by openings 334 and poppet pistons 336 are open so that exhaust gases may flow from inlet tube 312 through trap filters 322 and out openings 334 to outlet tube 314. Once exhaust gases flow into a particular filter 322, they are separated from the rest of the filters by walls 332 until the gases mix together again downstream from baffle 330. When the regeneration mechanism 300 closes one of the poppet valves, the trap associated with that valve can be regenerated.

Figure 15:
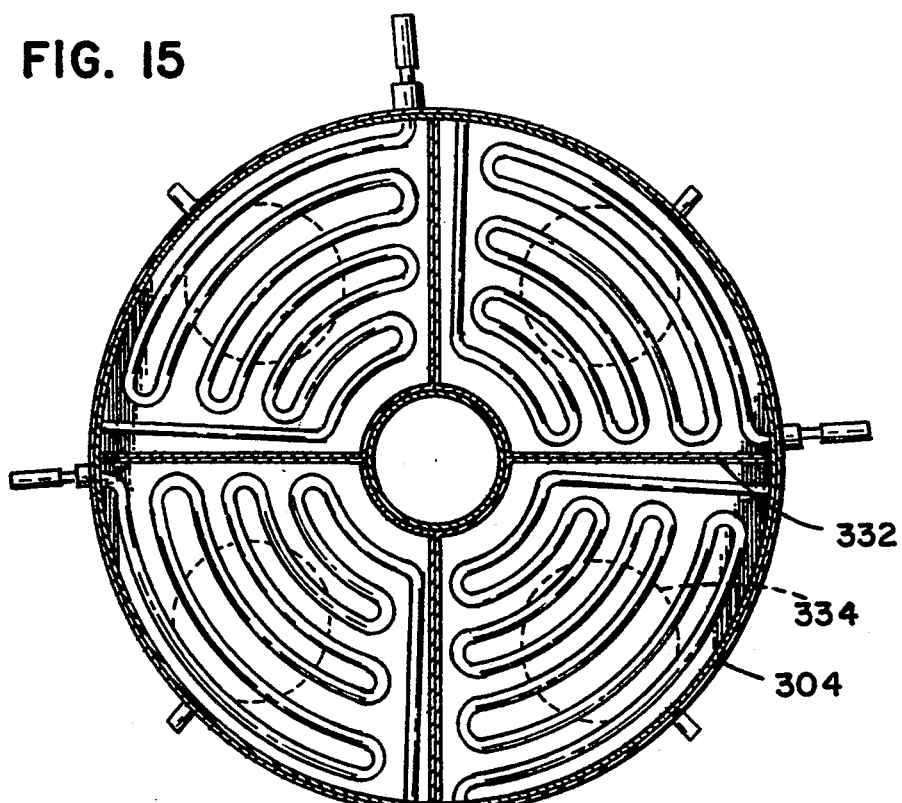
FIG. 15 is a cross-sectional view taken along line 15—15 of FIG. 14.

The regeneration mechanism 300 is the same as regeneration mechanism 112 described with respect to FIG. 3, except it has four separate thermocouples, heating elements, and downstream pressure transducers for measuring pressure drop across a particular filter (see FIG. 15). Regeneration mechanism 300 also provides for combustion air in a different fashion. Air source 338 is in fluid communication with valve 340 via line 342. There is a valve 340 for each of the various poppet valves 344. Valves 340 are normally closed and are opened by a communication via line 346 from the processor unit of regeneration mechanism 300. Each valve 340 is in fluid communication via line 348 through a check valve 350 to a chamber 352 fastened to the outer end of baffle 308. Poppet piston 336 extends into chamber 352 and is held normally open by a spring 354 in compression between the end of chamber 352 near baffle 308 and the end of poppet piston 336 opposite the tapered end 356 which fits in opening 334. The shaft of piston 336 has a passageway 358 for providing fluid communication of combustion air from air source 338 to a regenerating filter. As indicated, poppet valve 344 is normally open, and when valve 340 opens the pressure in chamber 352 closes poppet piston 336 and forces air through passageway 358 to provide appropriate combustion air for regeneration. Check valve 350 prevents exhaust gases from escaping into line 348. It is noted that air flowing through passageway 358 cools the poppet piston and advantageously may allow for the use of lower temperature, lower cost seals, not shown but known to those skilled in the art.

It is noted that apparatus 296 is shown configured for reverse regeneration. The poppet valves can be located at the upstream end along with the other appropriate regeneration mechanism elements so that regeneration could proceed alternatively in a forward direction. Also, combustion air could be furnished in the fashion of regeneration mechanism 112 and the poppet valves could be electrically or mechanically functioned and would, consequently, not have passageways through the pistons. Apparatus 296 is particularly advantageous in that it provides for constant filtering, as well as periodic regeneration, and it does so in a fashion which requires a pro rata percentage less power and air for regeneration of a single segment as compared with power and air required if all segments were regenerated at once.

Figure 17:
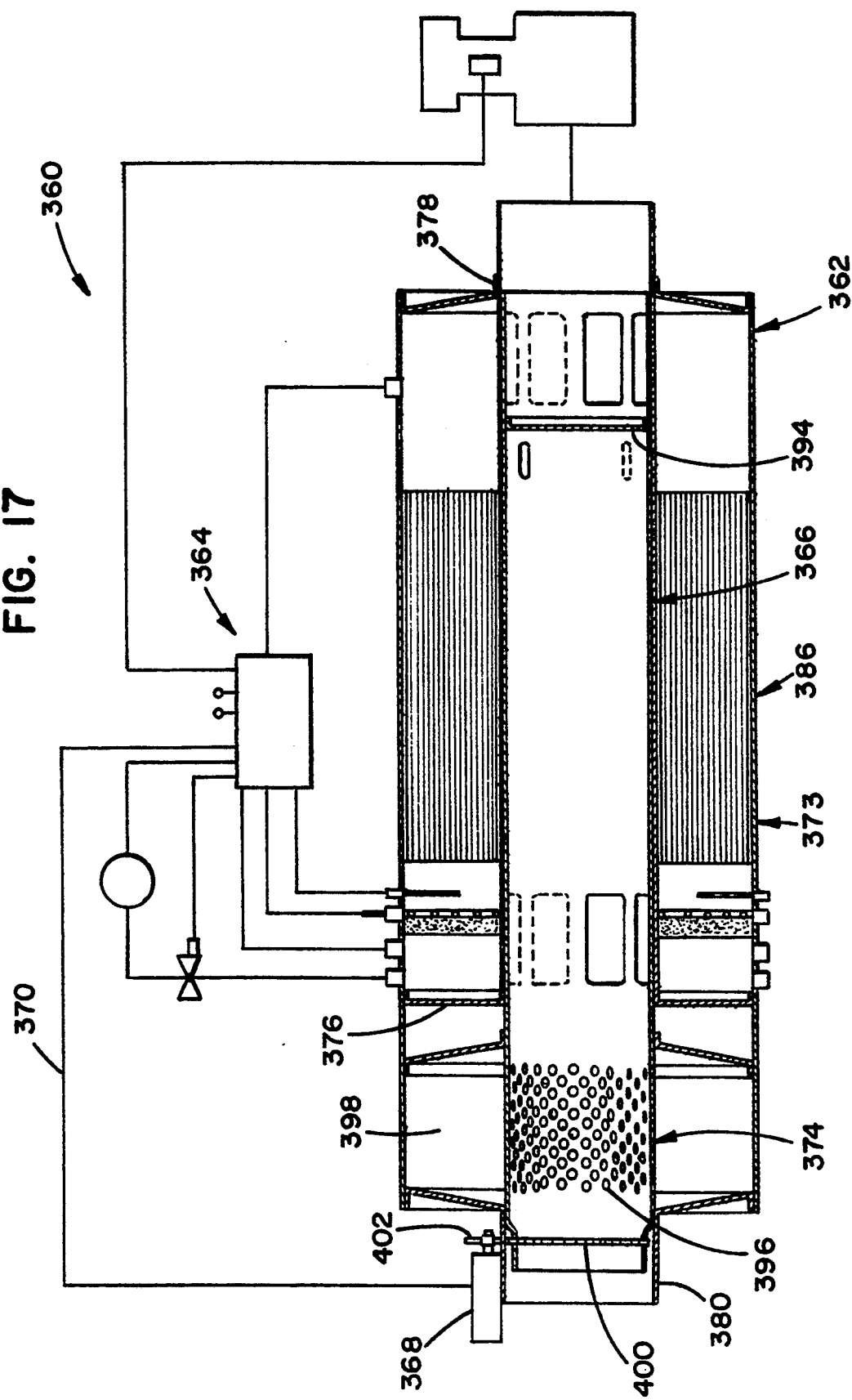
FIG. 17 is a schematic illustration of an alternate embodiment trap muffler apparatus with a segmented trap and an axial tubular shutter valve assembly used in the regeneration system.

Apparatus 360 shown in FIG. 17 is another embodiment of a segmented trap type trap filter apparatus. Apparatus 360 has a trap muffler device 362 with regeneration mechanism 364. Regeneration mechanism 364 is exactly the same as regeneration mechanism 300 except tubular shutter valve assembly 366 is controlled by an electrical motor 368 via line 370 leading to the processor unit. Also, combustion air is directed directly into the various trap chambers in a fashion similar to regeneration mechanism 112 rather than through poppet pistons.

Trap assembly 373 is the same as trap assembly 320 of apparatus 296, except tubular shutter valve assembly 373 extends through trap assembly 366 rather than core rod 328 as with apparatus 296. Assembly 366 is formed to have an outer tube 372 and an inner tube 374 (see also FIG. 18). Outer tube 372 extends from spider bracket 376 to inlet 378. Inner tube 374 extends from outlet tube 380 to near inlet 378. Regularly circumferentially spaced upstream and downstream openings 382, 384 are formed in outer tube 372. A small set of exhaust openings for combustion air is also formed in outer stream 372 upstream from trap assembly 386 and downstream from openings 382. Outer tube 372 does not rotate.

Inner tube 374 has regularly spaced upstream and downstream openings 388, 390 around three-quarters of the circumference of the tube. A single opening 392 for combustion air exhaust is formed centered in the region where there are not upstream and downstream openings 388, 390 and where opening 392 can register with the openings 385. A wall 394 is provided between openings 388 and opening 392. A plurality of openings 396 are provided to allow exhaust gases to expand into resonating chamber 398. A row of regularly spaced openings 400 is formed in the downstream end of inlet tube 374 around the circumference to receive the teeth of gear 402 driven by motor 368. Regeneration mechanism 364 energizes motor 368 as appropriate to rotate inner tube 374 so that openings 388 and 390 are in registration with openings 382 and 384 everywhere except for the filter segment which it has been determined by regeneration mechanism 364 requires regeneration. With respect to that filter, opening 392 is in registration with one of openings 385 to provide an exhaust for combustion air.

The configuration of apparatus 360 provides for reverse regeneration. For the filter segments which are not being regenerated, exhaust gases flow through openings 388 and 382 for filtration by the various segments of trap 386 not being regenerated and then flow through openings 384 and 390 for exhaust past resonating chamber 398 to outlet tube 380. Regeneration mechanism 364 can rotate inner tube 374 so that the appropriate filter segment can be regenerated. Alternatively, inner tube 374 can be periodically rotated so that regeneration automatically occurs after a predetermined amount of operating time has passed.

Apparatus 404 shown in FIG. 20 is still another embodiment of a segmented trap-type trap filter apparatus. Apparatus 404 includes trap muffler device 406 and regeneration mechanism 408. Device 406 has a housing 410 with an outer cylindrical wall 412 and end baffles 414 and 415. Each end baffle includes a tubular portion 416 and 417 extending outwardly. A tube 418 having an outer diameter only slightly less than the inner diameter of tubular portion 416 extends from portion 416 through housing 410 to the upstream end of filter carousel 426. The downstream end of tube 418 is reduced in size and includes a plurality of regularly spaced openings 420 around its periphery which allows a drive unit 422 having a small gear 424 fitting in a slot in portion 416 to rotate tube 418 as desired.

A filtering mechanism for apparatus 404 in the form of a carousel 426 includes a plurality of ceramic filter elements 428. Elements 428 are shown to be cylindrical in the FIGURES, but they could as well have other shapes. Carousel 426 is affixed to tube 418 at elements 430 which surround tube 418 at opposite ends and near the mid-length of elements 428. Each ceramic element 428 may be mounted in individual canisters with appropriate intumescent material and sealing rope as adequately described hereinbefore. The various individual mountings are regularly spaced and transversely supported as necessary, the details of which are adequately known to those skilled in the art and are not important to the present invention. It is noted, however, that to properly direct the exhaust gases and to prevent the exhaust gases from bypassing filter elements, that tube 418 has a plurality of downstream openings 434, and that it is necessary to provide adequate seals 436 between the carousel canister and the filter modules on the inside of carousel 426, and also adequate seals 438 between the carousel canister and wall 412 on the outside of carousel 26.

Exhaust gases flow into tube 418 and through any of the various ceramic filter elements 428 before exhausting device 406 from openings 434 and tube 417. A wall 440 blocks the central portion of tube 418 and prevents exhaust gases from bypassing all of elements 428.

Apparatus 404 is distinguished from apparatus 296 of FIG. 14 and apparatus 360 of FIG. 17 in that it has only a single heater element 442 and related elements as described hereinafter to accomplish regeneration. The idea of apparatus 404 is that periodically as necessary the carousel is turned to sequentially move a ceramic filter element in an appropriate relationship with heater element 442 and other mechanism to provide for regeneration of a particular ceramic filter element while the others continue to filter exhaust gases flowing through them. To accomplish this, heating element 442 is supported by piston 444 at an end 446 which includes a cylindrical skirt peripherally enclosing heating element 442. The end of the skirt holds a seal 448 which seals against the carousel. Poppet piston 444 extends into chamber 450 and is held normally open by a spring 452 in compression between the end of chamber 450 near end baffle 414 and the end of poppet piston 444 opposite end 446 which supports heating element 442. The shaft of piston 444 has a passageway 454 for providing fluid communication of combustion air during regeneration.

Regeneration mechanism 408 in addition to the poppet valve assembly includes a processor unit 456. Processor unit 456 is wired to heating element 442 via line 458. Processor unit 456 is wired to drive unit 422 via line 460. Processor unit 408 controls air source 462 via line 464. Air source 462 provides air to chamber 450 via line 466. Under a simple form of regeneration as indicated, the processor unit provides a clock function which periodically rotates carousel 426. It is understood that other control strategies could be used as well. Whenever a different filter element 428 is rotated adjacent to heating element 442, the heating element is turned on and after a delay combustion air is turned on so that when the particulates ignite, the flame front can proceed through the filter element and regenerate it. The air and heat are turned off and when appropriate, the next filter element is rotated into place.

Apparatus 404 has the advantages of the other segmented traps discussed. In addition, it requires only a single regeneration heating element rather than multiple ones.

Figure 22:
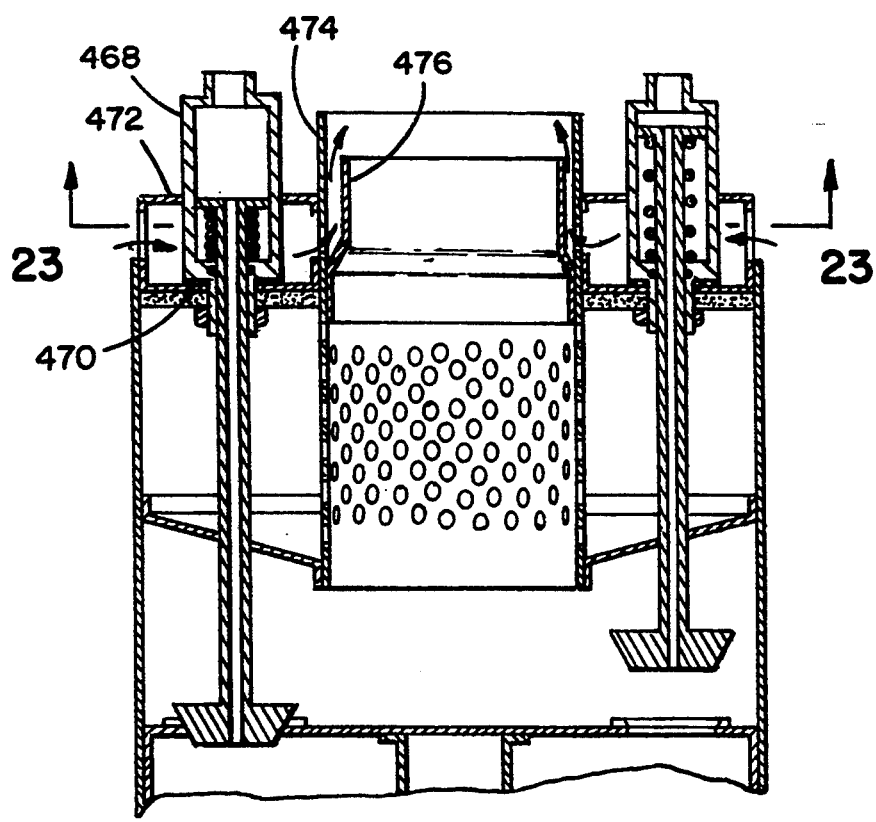
FIG. 22 is a cross-sectional detail showing cooling mechanism for a poppet valve assembly.
Figure 23:
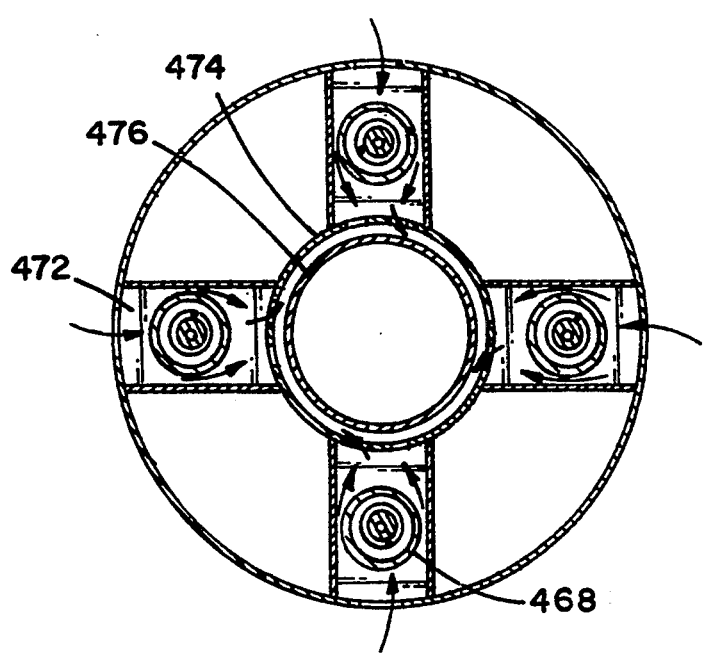
FIG. 23 is an end view of the apparatus of FIG. 22.

With respect to apparatus using poppet valves, for example, apparatus 296 in FIG. 14 and apparatus 404 in FIG. 20, it may be necessary as shown in FIGS. 22 and 23 to cool the chamber 468 which extends outwardly from the trap muffler housing. In that case, a low temperature seal 470 can be used. One way of providing cooling is to aspirate air through a chamber 472 such that the air passes around and cools the walls of chamber 468 as shown in FIG. 23. A chamber 472 would be mounted to extend outwardly from outlet tube 474 and to enclose the portion of chamber 468 which is closest to the trap muffler housing. Openings at the outer side of chamber 472 and at tube 474 would allow ambient air to be drawn therethrough. The necessary aspirating effect is achieved by providing a reduced inner tubular section 476 in the vicinity of the openings in outlet tube 474.

Figure 24:
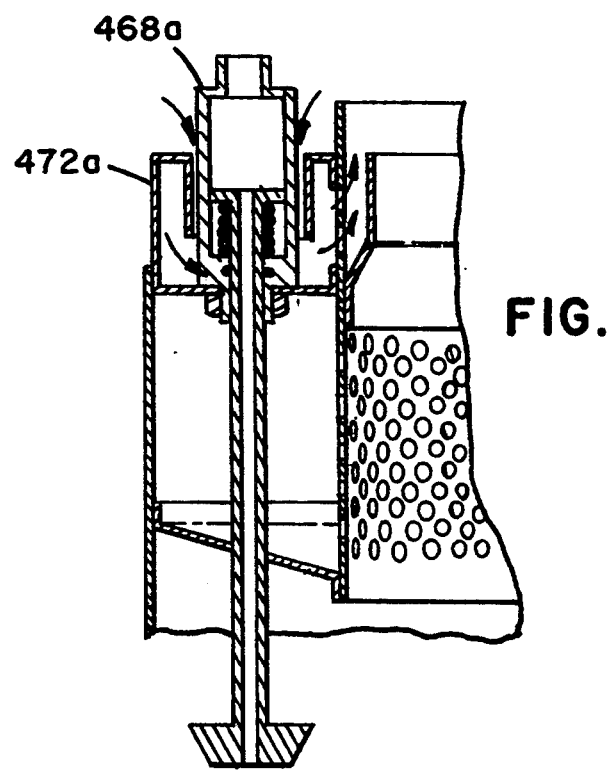
FIG. 24 is a cross-sectional detail of an alternate embodiment of cooling mechanism for a poppet valve assembly.

An alternative cooling structure is shown in FIG. 24 where chamber 472a has an opening adjacent to chamber 468a and furthermore has a concentric wall surrounding chamber 468a so that the air stays in contact with the chamber for a longer flow distance and therefore provides greater cooling effect.

Figure 25:
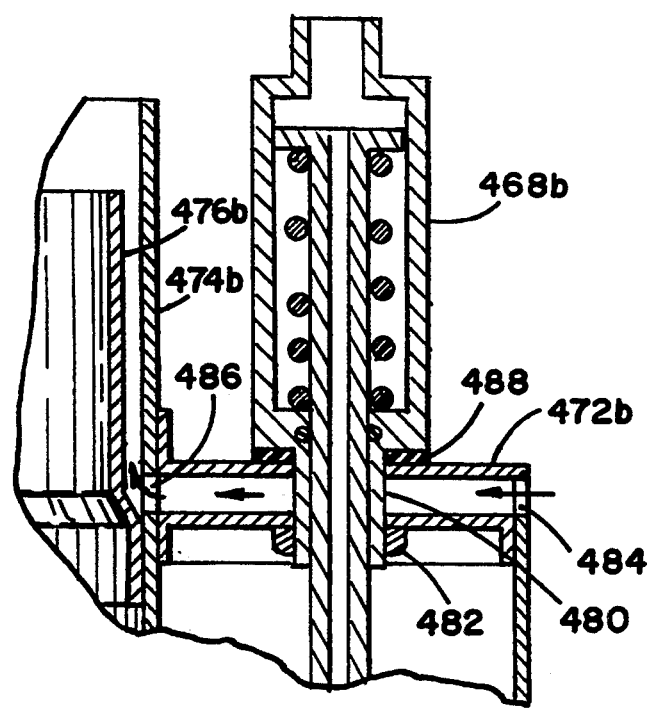
FIG. 25 is a cross-sectional detail showing an alternate embodiment cooling mechanism for a poppet valve assembly.

A further alternative cooling structure is shown in FIG. 25 where chamber 472b is mounted between the end of chamber 468b and the trap muffler housing. In this case, chamber 468b is provided with a longer threaded portion 480 which extends through chamber 472b and the end of the trap muffler housing for retention by a nut 482. Air is aspirated through outer opening 484 of chamber 472b to flow around portion 480 and into space between the reduced tubular section 476b and the outlet tube 474b by passing through opening 486. In this way, portion 480 is cooled and a low temperature seal 488 can be used between chamber 468b and chamber 472b.

Figure 26:
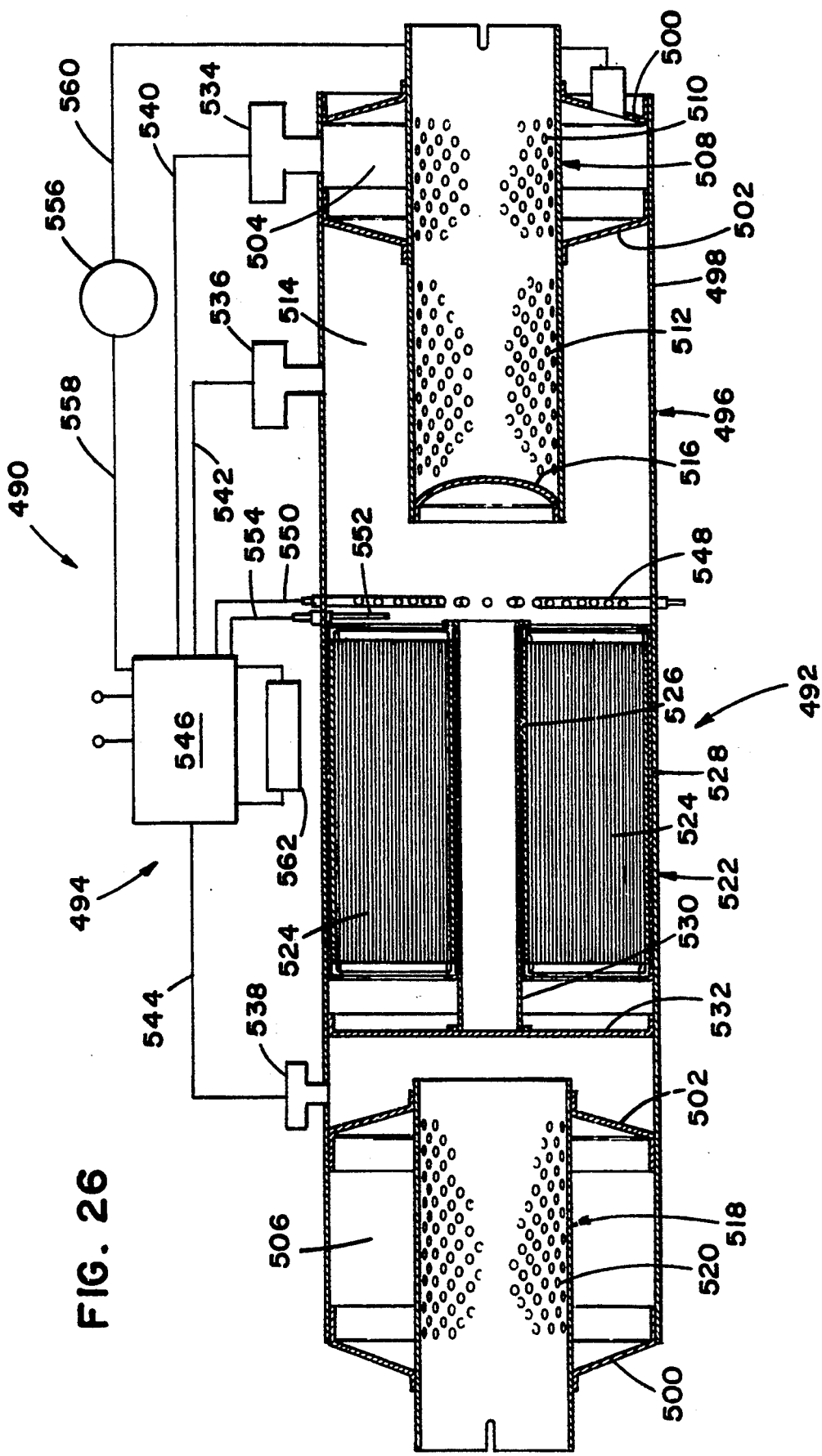
FIG. 26 is a cross-sectional view of a trap muffler apparatus similar to FIG. 14 except having a single full face regeneration system.

Apparatus 490 shown in FIG. 26 is another embodiment of a segmented trap-type filter apparatus. Apparatus 490 includes trap muffler device 492 and regeneration mechanism 494. Device 492 has a housing 496 comprising a cylindrical wall 498 with opposite end walls 500 and interior baffle members 502. The end walls 500 and baffle members 502 are fastened to wall 498 to form resonating chambers 504 and 506. An inlet pipe 508 is attached to and held by an end wall 500 and a baffle member 502 at the inlet end of device 492. Inlet pipe 508 is perforated with a plurality of first openings 510 to provide flow to resonating chamber 504 and second openings 512 to provide flow to the expansion chamber 514 located between the interior baffle members 502. Closure member 516 prevents fluid communication from the end of inlet pipe 508.

Similarly, an outlet pipe 518 is attached to and held by an end wall 500 and baffle member 502 at the downstream end of device 492. Openings 520 provide fluid communication to chamber 506.

Trap assembly 522 has a plurality of identical filter elements 524 held in a fashion similar to trap assembly 320 shown in FIGS. 14 and 16. Each element is preferably wrapped in a heat-resistant material 526 which is the same as material 144 described earlier. The various elements 524 are contained within a common container 528 which is formed to support them at upstream and downstream ends with collars (not shown) extending inwardly from canister 528 and outwardly from core rod 530. In this way, the upstream and downstream ends are aligned substantially along upstream and downstream transverse planes. A sealing material (not shown), similar to material 146, is also used between material 526 and the various collars. Canister 528 is tack welded or otherwise affixed to wall 498. Core rod 530 extends from the upstream end of trap assembly 522 to a spider 532 located between the downstream end of trap assembly 522 and baffle member 502.

Regeneration system 494 senses differential pressure across the trap assembly and compares it to a baseline differential pressure measured between resonating chamber 504 and expansion chamber 514 at a location downstream from the trap assembly. Fittings 534, 536, 538 providing the appropriate pressure sensing are connected via lines 540, 542, and 544 to processor 546. If the ratio of the baseline pressure to the trap pressure is greater than a predetermined value and the core temperature is above a low limit, exhaust is diverted upstream from trap assembly 492 and heater element 548 connected to processor 546 via line 550 is turned on. Heater element 548 heats all filter elements 524 simultaneously. Temperature is measured at thermocouple 552 which is connected to processor 546 via line 554. When temperature near the upstream face of trap assembly 528 reaches a predetermined value, combustion air is turned on. In this regard, air source 556 is controlled by processor 546 via line 558. Air is directed from source 556 through line 560 into chamber 504. As combustion starts, timer 562 times and turns off heater element 548. With regeneration completed, source 556 is turned off and exhaust is again directed through trap assembly 492.

The regeneration control logic is disclosed in more detail in U.S. Pat. No. 4,851,015 incorporated herein by reference. It is understood, however, that other regeneration control logic systems may also be used.

A ceramic filter element of the wall flow monolith type which is segmented as herein disclosed has many advantages over a non-segmented element of the same type. For example, a segmented monolith due to the smaller size of the segments relative to the element as a whole can be produced at a higher production speed because it can be processed on high volume, catalytic converter type production equipment. Much greater care must be taken with respect to larger, non-segmented monolith elements. Furthermore, there is a much lower demand for larger elements so that high speed production equipment has not been developed. Also, with respect to segment production, there is a much higher yield of good segments because of reduced losses in kiln firing and handling. In addition, there is a much shorter firing cycle in the kiln because of the smaller size of the segments relative to tho whole. All these factors lead to a significantly lower cost of a segmented monolith relative to a non-segmented element of the same size.

There are still additional advantages. Because of the smaller size of segments, they have a higher thermal shock resistance. Since all the embodiments of the present disclosure use segments which are not cemented together, but are rather physically separated so that exhaust flowing through one segment does not flow to a sidewardly adjacent segment, the individual segments allow for individual regeneration. As a consequence, segments can expand and contract individually and do not transmit stress to one another. Regeneration durability is thus improved.

Thus, the present invention is disclosed in a variety of embodiments. Although the various embodiments have been described in detail and the advantages of structure and function set forth, it is understood that other equivalents may also be possible. Therefore, if changes are made in the structure with respect to the various embodiments, especially in matters of shape, size, and arrangement, it is understood that they too are encompassed within the invention to the full extent extended by the general meaning of the terms in which the appended claims are expressed.

Some particular preferred valve constructions for use in arrangements such as those described are illustrated in the drawings of FIGS. 27-30. In general the drawings are fragmented, and do not show the inlet portions of the muffler assemblies whereat other components described above. It will be understood that many of the arrangements and features discussed or described above could be utilized. In addition, the particular valve assemblies illustrated in FIGS. 27-30 could be utilized in alternate assemblies.

Figures 27, 28:
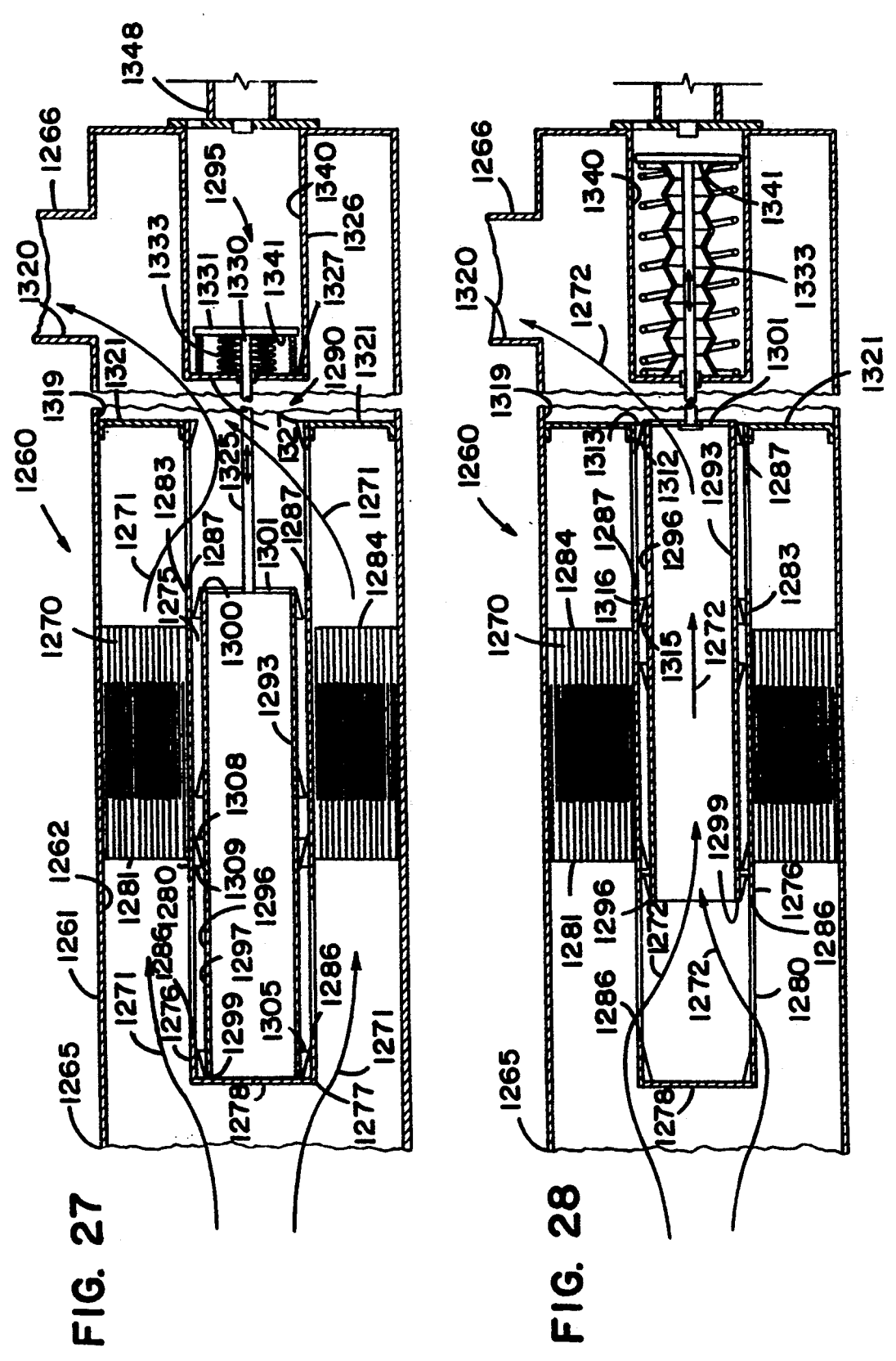

FIGS. 27 and 28

In FIG. 27, reference numeral 1260 generally designates a muffler assembly or apparatus. Muffler assembly 1260 comprises shell or housing 1261 defining internal volume 1262. In FIGS. 27 and 28, housing 1261 is represented fragmented at end 1265. End 1265 is directed toward an upstream end, while end 1266 is downstream (with respect to normal exhaust flow).

Housing 1261 is fragmented at end 1265 to indicate that upstream of the assembly depicted in FIGS. 27 and 28 there may be a variety of inlet constructions, including ones having arrangements as described with respect to FIGS. 1-26. In some instances modifications to specific mechanical components may be necessary to accommodate the particular components illustrated in the depicted embodiments of FIGS. 27 and 28. In addition, while acoustics or acoustical constructions are not reflected in FIGS. 27 and 28, they may be incorporated therein or positioned within portions of the housing 1261 not depicted.

Referring to FIGS. 27 and 28, assembly 1260 includes core 1270 therein. Core 1270 may comprise a variety of materials for a variety of purposes, as generally indicated hereinbelow. With respect to exhaust gas flow and general operation of assembly 1260, what is first to be understood is that the arrangement allows for: (1) selective passage of exhaust gases through core 1270, if desired; and (2) selective passage of exhaust gases in a manner bypassing core 1270, if desired. In FIG. 27, exhaust gas flow through core 1270 is depicted. In FIG. 28, assembly 1260 is configured for exhaust gas flow to bypass core 1270. In general, exhaust gas flow through assembly 1260 in FIG. 27 is reflected by arrows 1271. Exhaust gas flow through assembly 1260 as configured in FIG. 28 as indicated generally by arrows 1272. Herein, when exhaust gas flow is described as being "through" the core 1270, it is meant that the gases are directed such that they can be acted upon by the core or items thereon (e.g. filtering or catalytic action). Even when the gas flow bypasses the core 1270, the gases still must pass from one side of the core 1270 to another and, when the passage way is through a central bore in the core, might be described by some as "through" the core 1270. However, since the bore is, under these latter circumstances, merely an open conduit, the core 1270 is referred to herein as bypassed under such circumstances.

Core 1270 may comprise a variety of units for a variety of purposes. For example, core 1270 may comprise a particulate filter or trap, used to filter or collect particulate material in an exhaust gas flow passing therethrough. When particulate traps are utilized as core 1270, in some instances regeneration units, not shown, may be provided to regenerate the particulate trap periodically as desired. Typical such units comprise heaters or the like configured to combust particulate material trapped on the core, at selected points in time and were described above with respect to FIGS. 1-26.

Of particular concern with respect to the embodiments of FIGS. 27 and 28, is the means by which core 1270 is selectively bypassed, when desired. Referring to FIG. 27, core 1270 includes a central bore 1275 therein. Tube 1276 extends through bore 1275, and is preferably snugly fit therein. Upstream end 1277 of tube 1276 is closed by end cap 1278. A portion 1280 of tube 1276 is positioned on the upstream side 1281 of core 1270. In addition, a portion 1283 of tube 1276 projects outwardly from downstream side 1284 of core 1270.

Upstream portion 1280 of tube 1276 includes exhaust flow apertures 1286 therein. Downstream portion 1283 of tube 1276 includes exhaust flow apertures 1287 therein.

Arrangement 1260 includes therein a flow bypass control assembly 1290. Selected operation of flow bypass control assembly 1290 allows selective direction of exhaust flow gases through core 1270, FIG. 27, or in a manner bypassing core 1270, FIG. 28.

Referring to FIG. 27, flow bypass control assembly 1290 includes tubular valve member 1293 and actuator system 1295. Tubular valve member 1293 comprises a cylindrical tube 1296 having an outer cylindrical surface 1297 with no apertures or exhaust flow passageways therein. Upstream end 1299 of tube 1296 is open, to passage of gases therein.

Downstream end 1300 of tube 1296 is open, and includes spider bracket 1301 mounted thereat. Spider bracket 1301 is sufficiently open to allow passage of exhaust gases thereacross, when system 1260 is appropriately configured. Spider bracket 1301 is engaged by actuator system 1295, for control of the positioning of tubular valve member 1293 as further described hereinbelow.

Tubular valve member 1293 is constructed, arranged and appropriately sized for operation as a shutter to passageways 1286, 1287, as follows. In FIG. 27, tube 1296 is shown in a first extreme position closing apertures 1286. The result of closing apertures 1286 is that exhaust gases are directed through core 1270, and do not bypass same. Apertures 1286 are closed, by having tube 1296 directed with end 1299 sealed against end cap 1278. Sealing is provided by conical seal ring 1305. Escape of gases through the space between tubular valve member 1293 and tube 1280 is also provided by engagement between conical seal ring 1308 on member 1296 and conical seal ring 1309 on tube 1280.

Tubular valve member 1293 is further constructed, arranged and sized such that it can be positioned as shown in FIG. 28 to allow bypass of core 1270. In particular in FIG. 28, tube 1296 is shown oriented in a second extreme position, opening aperture 1286 and closing aperture 1287. Aperture 1287 is effectively sealed closed by engagement between conical seal ring 1312 on tube 1296 and conical seal ring 1313 on tube 1280. Gas flow between tubular valve member 1293 and tube 1280, when configured as shown in FIG. 28, is inhibited by sealing engagement between conical seal ring 1315 on tube 1296 and conical seal ring 1316 on tube 1280.

From a comparison of FIGS. 27 and 28, and considering the above descriptions, the operation of flow bypass control assembly 1290 should now be apparent. When configured as shown in FIG. 27, tube 1296 blocks passage from exhaust flow through apertures 1286, thus directing exhaust gas flow through core 1270. Once having passed through core 1270, exhaust flow is directed through apertures 1287, into volume 1319 and through outlet 1320. Direction of exhaust gas flow through apertures 1287 is facilitated by end cap 1321. Opening of apertures 1287 to allow exhaust gas flow therethrough is indicated in FIG. 27, and is facilitated by an appropriate longitudinal dimension to tubular valve member 1293.

When it is desired that core 1270 be taken off line, i.e. be bypassed by exhaust gas flow, the tubular valve member 1293 is moved to the orientation shown in FIG. 28. In FIG. 28, tube 1296 has been moved to open aperture 1286, allowing exhaust gas flow therethrough into end 1299 of tube 1296. The gases can flow through tube 1296 and outwardly from downstream end 1300, as indicated, into volume 1319 and to outlet 1320. Flow through core 1270 is inhibited, since downstream outlets or apertures 1287 are blocked, as shown.

As indicated above, an actuator system 1295 is provided, for selective actuation of tubular valve member 1293 between the two extreme or operating positions reflected in FIGS. 27 and 28. It is foreseen that a variety of actuator systems may be utilized, including mechanical constructions, constructions operated by solenoid switches, pneumatic and hydraulic systems. The arrangement depicted in FIGS. 27 and 28 comprises a pneumatically controlled system.

Referring to FIG. 27, actuator system 1295 includes control link 1325 which comprises a shaft connected to spider bracket 1301. Control link 1325 communicates with apparatus positioned within piston chamber 1326. In particular, control link 1325 extends through front wall 1327 of piston chamber 1326 as shown. End 1330 of link 1325 includes plate 1331 thereon.

Actuator system 1295 includes flexible metal bellows 1333 in engagement between plate 1331 and front wall 1327, around link 1325. In cooperation, wall 1327, bellows 1333 and plate 1331 isolate volume 1340 from volume 1341 (and the pressure within volume 1319). It will be understood then that if the pressure in volume 1340 is increased to be greater than that of the pressure in volume 1341, i.e. the pressure in volume 1319, control link 1325 will be driven to the extreme indicated in FIG. 27. On the other hand, if the pressure in volume 1340 is sufficiently reduced relative to the pressure in volume 1341, i.e. the pressure in volume 1319, control link 1325 will be driven to the position indicated in FIG. 28. Of course movement in the control link 1325 results in movement of tubular valve member 1293. Operation as described assumes pressures within volumes 1340 and 1341 such that gases therein are readily compressible. Such would be the case for typical operating pressures of mufflers.

Means for modifying the pressure in volume 1340 comprise pneumatic tube 1348, which may be connected to appropriate means for control of the pressure.

Figure 29:
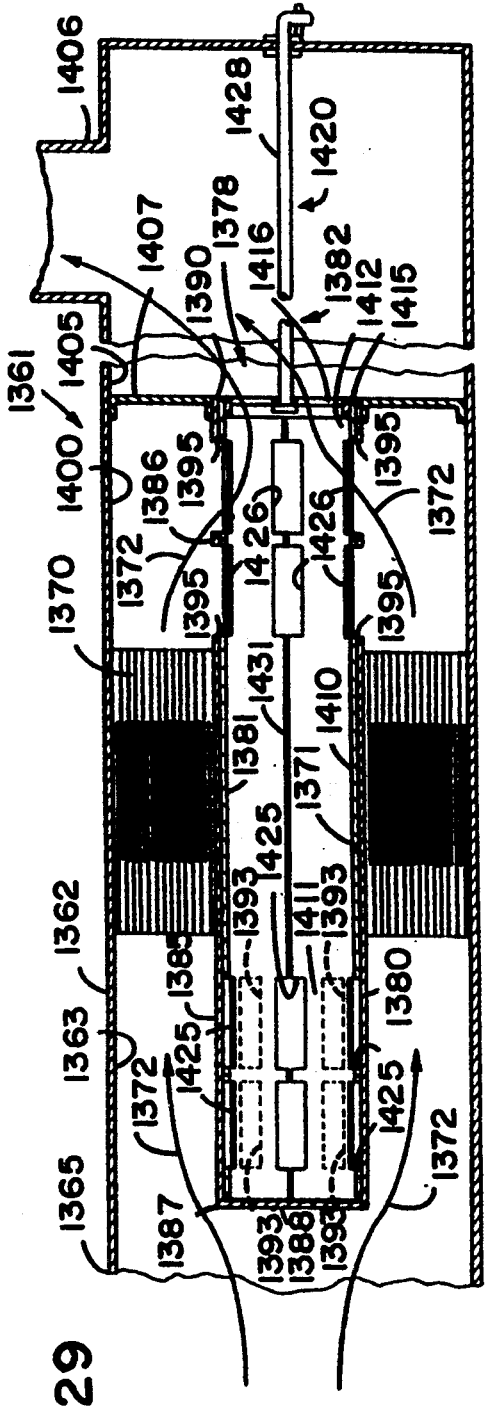
FIG. 29 is an apparatus generally analogous to that shown in FIG. 27.
Figure 30:
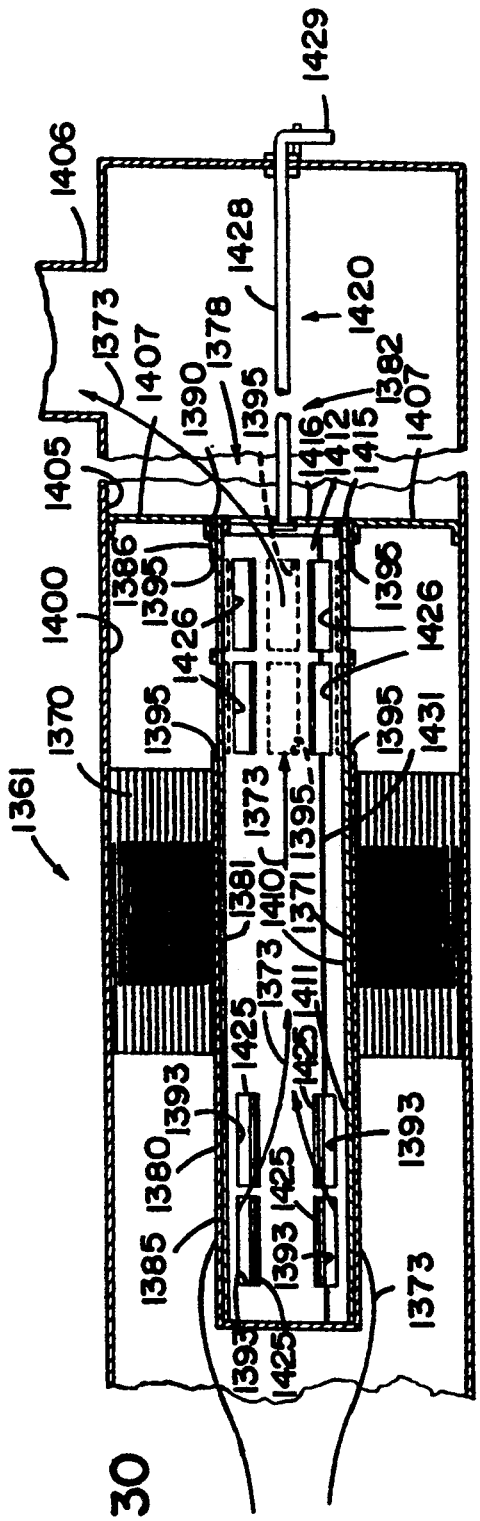
FIG. 30 is a view generally analogous to FIG. 29 wherein the bypass valve assembly is depicted in a bypass mode generally analogous to the arrangement shown in FIG. 28.

FIGS. 29 and 30

For the arrangement depicted in FIGS. 27 and 28, actuator system 1295 to generate bypass of core 1270, operates with linear or longitudinal movement of a tubular valve member 1293. In FIGS. 29 and 30, an alternative construction, operable on radial movement of a tubular valve member rather than longitudinal movement thereof, is depicted.

Referring to FIG. 29, muffler assembly 1361 comprises housing or shell 1362, defining internal volume 1363. Analogously to the arrangement shown in FIGS. 27 and 28, upstream end 1365 of shell 1362 is shown fragmented. Within shell 1362 is positioned (circular) core 1370 having central bore 1371 extending therethrough. In FIG. 29, assembly 1361 is depicted with core 1370 on line, i.e. with exhaust gases passing therethrough as indicated generally by arrows 1372.

In FIG. 30, assembly 1361 is shown configured with core 1370 taken off line, i.e. with exhaust flow bypassing core 1370 as indicated generally by arrows 1373.

For the arrangement shown in FIGS. 29 and 30, selective control of the direction of exhaust gas flow to direct same through core 1370, or to bypass core 1370, is provided by flow bypass control assembly 1378. In general, flow bypass control assembly 1378 comprises tube 1380, tubular valve member 1381 and actuator system 1382. Tube 1380 and tubular valve member 1381 in general comprise a valve as described herein. Actuator 1382 selectively provides for operation of the valve or control assembly 1378. In particular, actuator 1382 controls movement of tube 1380 and tubular valve member 1381 between selected preferred positions or orientations, i.e. the configurations illustrated in FIGS. 29 and 30.

Referring to FIG. 29, tube 1380 extends through bore 1371, preferably snugly adjacent core 1370. Tube 1380 includes portion 1385 extending upstream from core 1370, and downstream portion 1386 extending downstream from core 1370. Upstream portion 1385 terminates at end 1387, which is preferably enclosed by end cap 1388. End cap 1388 is closed to the passage of exhaust gases therethrough. Downstream portion 1386 of tube 1380 terminates at end 1390, which is open to the passage of gases therethrough.

Still referring to FIG. 29, upstream portion 1385 of tube 1380 includes a plurality of apertures 1393 therein.

In FIG. 29, the apertures are shown in phantom lines, since they would not be viewable due to being covered up by a portion of tubular valve member 1381. In FIG. 30, apertures 1393 are aligned with apertures in tubular valve member 1381, as described below, and thus are opened, unblocked and viewable.

Referring again to FIG. 29, downstream portion 1386 of tube 1380 includes a plurality of apertures 1395 therein.

Now referring to FIGS. 29 and 30 together, general operation of flow bypass control assembly 1378 will be apparent. In FIG. 29, exhaust gas flow is directed through core 1370. This is accomplished by providing that apertures 1393 are closed, thus allowing the exhaust gas no path other than through core 1370. On the downstream side of core 1370, the exhaust gases can pass through apertures 1395 and escape from volume 1400 as indicated by the arrows 1372.

When the assembly 1361 is configured as illustrated in FIG. 30, on the other hand, exhaust gases can pass through aperture 1393 into a central area of tube 1380. They are inhibited from passing into the downstream area of core 1370, since apertures 1395 are closed. Rather, the exhaust gases pass along the path indicated by arrows 1373 and outward from the assembly 1361, i.e. through volume 1405 and outlet 1406. End cover 1407 prevents gas flow into volume 1400.

From the above description, it is apparent that a purpose of tubular valve member 1381 is to provide for appropriate blocking of either aperture 1393 or apertures 1395 (FIG. 29 versus FIG. 30), while at the same time directing appropriate gas flow through assembly 1361. Configuration of the tubular valve member 1381 to affect this operation will be apparent from further examination of FIGS. 29 and 30.

Tubular valve member 1381 comprises an elongate cylindrical tube 1410 received within tube 1380. Tube 1410 includes an upstream portion 1411 aligned with upstream portion 1385 of tube 1380. Tube 1410 further includes a downstream portion 1412 aligned with downstream portion 1386 of tube 1380. Tube 1410 is open at downstream end 1415 to the passage of exhaust gases therethrough. Spider bracket 1416 is configured for engagement by an actuator mechanism 1420, detailed below, for selected movement or positioning of tube 1410. Preferably spider bracket 1416 is configured to allow passage of exhaust gases thereacross; i.e. spider bracket 1416 does not completely occlude end 1415 of tube 1410.

Upstream portion 1411 of tube 1410 includes a plurality of apertures of 1425 therein. Apertures 1425 are positioned so that they can be selectively aligned with apertures 1393 in tube 1380, FIG. 30, if desired. Preferably, apertures 1393 and apertures 1425 are also positioned on tube 1380 and 1410, respectively, so that tube 1410 can be rotated to completely remove apertures 1425 from alignment with apertures 1393, providing for a blockage of apertures 1393 as indicated in FIG. 29.

Downstream portion 1412 of tube 1410 includes a plurality of apertures 1426 therein. Apertures 1426 are positioned so that they can be selectively aligned with apertures 1395 in tube 1380, as indicated in FIG. 29, to allow passage of exhaust gases therethrough. Also apertures 1426 are positioned so that upon a selected rotation of tube 1410 they are brought out of alignment with aperture 1395, allowing portions of tube 1410 to block apertures 1395 as indicated in FIG. 30.

Apertures 1393 and 1395 should be positioned in tube 1380; and, apertures 1425 and 1426 should be positioned in tube 1410, such that whenever tube 1410 is oriented to allow apertures 1393 to be opened, it is simultaneously oriented to have apertures 1395 closed, FIG. 30; and, whenever tube 1410 is positioned to have apertures 1393 closed, it is simultaneously positioned to have apertures 1395 open, FIG. 29. This is readily accomplished by appropriate radial positioning of all of apertures 1393, 1395, 1425 and 1426 in each of tube members 1380 and 1410.

It is indicated generally hereinabove, operation of flow bypass control assembly 1378 between configurations allowing and directing flow through core 1370, FIG. 29 and, positions bypassing core 1370, FIG. 30, is conducted through rotation of one tube relative to the other, in particular for the embodiment shown through rotation of the inner tube 1410. Selected rotation of inner tube 1410 can be accomplished through operation of actuator mechanism 1420. For the embodiment illustrated in FIGS. 29 and 30, actuator mechanism 1420 comprises a control rod 1428 connected to spider bracket 1416. Appropriate rotational movement of control rod 1428 can be effected through control arm 1429 by a variety of means including mechanical link arrangements with solenoid switch controls. It will be understood that a variety of actuator mechanisms 1420 can be utilized in association with a flow bypass control assembly 1378 as generally described hereinabove. The particular mechanical arrangement shown is simple and advantageous. However, in general all that is required is that controlled rotational movement of tube 1410, when desired, can be obtained. It is noted that mechanical stops and the like, can be utilized to precisely control angular movement of tube 1410 between extreme positions, to allow for as precise overlap and coverage of apertures as may be desired for the particular use involved.

Still referring to the assembly 1361 of FIGS. 29 and 30, in general the construction involves mating tubes 1380 and 1410. Generally a snug but not extremely tight seal between the two tubes 1380 and 1410 will be preferred. For the arrangement shown in FIGS. 29 and 30 a particularly advantageous method of achieving this snug relationship is represented. More specifically, tube 1410 includes a longitudinal cut, slit or slot extending completely therealong (i.e. through a complete longitudinal extension), as indicated generally at 1431. The slot 1431 extends the complete length of tube 1410, generally parallel to its central axis. The slot preferably extends through a set of longitudinally lined apertures 1425,1426 in tube 1410. Slot 1431 allows tube 1410 to be compressed slightly, as it is inserted into tube 1380. If tube 1410 is made of appropriate memory material, such as a spring steel or the like, and has a position of memory or size of appropriate radius, when the compression pressure is released, tube 1410 will re-expand within tube 1380 to provide a snug fit. Slot or slit 1431 preferably extends through apertures 1425 and 1426 in tube 1410, so that upstream portions of the slit 1431 will be closed whenever the upstream apertures 1425 are closed; and, downstream portions of slit 1431 will be closed whenever downstream apertures 1426 are closed. It will be understood that a similar slit arrangement in one of the tubes could also be used to ensure a snug fit in arrangements such as those shown in FIGS. 1–26.

The outer tube 1380 could alternatively be slit, and be forced to expand slightly upon insertion of tube 1410, to provide a snug fit. That is, rather than as described above wherein the inner tube is compressed slightly while inserted within the outer tube, the arrangement would be such that the outer tube is expanded slightly during the insertion. In either case a snug fit can be readily obtained. With this latter alternative, generally the slit would preferably be aligned with apertures in the outer tube. With respect to this, it is noted that for the embodiment shown in FIGS. 29 and 30, in general apertures in the upstream portion 1385 of outer tube 1380 are radially offset from apertures in the downstream portion 1386 of the outer tube 1380; whereas apertures in the inner tube on upstream and downstream portions 1411 and 1412, respectively, are longitudinally aligned. This is particularly convenient when it is the inner of the two tubes that is to include the slit, since the slit can pass through both upstream and downstream apertures in the inner tube at the same time. However, if the alternate referred to above is to be applied, i.e. wherein the slit is in the outer tube, it may be preferred to have upstream and downstream apertures in the outer tube aligned, with upstream and downstream apertures in the inner tube offset radially.

The utilization of a slit in one or the other of the inner and outer tubes, to provide for snug fit between the tubes, may be applied in other radial tubular valve constructions depicted herein.

What is claimed is:

1. Apparatus for processing exhaust gases from an engine, said apparatus comprising:
   (a) a housing with inlet means, outlet means, and first and second fluid flow paths with respect to said inlet means upstream and said outlet means downstream;
   (b) an acoustic element within said housing for attenuating a sound of exhaust gases along said first and second fluid flow paths;
   (c) means, within said housing, for filtering particulates from the exhaust gas along said first fluid flow path; said means for filtering comprising a ceramic filter element;
   (d) means, forming a section of said second fluid flow path, for bypassing a portion of said means for filtering to direct exhaust gases from said first fluid flow path to said second fluid flow path;
      (i) said means for bypassing including an upstream valve relative to said ceramic filter element and a downstream valve relative to said ceramic filter element; said upstream and downstream valves being in said housing and each being a part of one of said inlet means and said outlet means; said upstream valve being open When said downstream valve is closed, and vice versa;
      (ii) said upstream valve and said downstream valve comprising tubular shutter valves; and,
      (iii) said means for bypassing further including a disk shutter valve between said upstream valve and said ceramic filter element;
   (e) means for regenerating said means for filtering; and,
   (g) means for controlling said regenerating means and said bypassing means.

2. Apparatus in accordance with claim 1 wherein said regenerating means includes means for heating said ceramic filter element and means for introducing combustion air to said ceramic filter element both being essentially between said disk shutter valve and said ceramic filter element.

3. Apparatus in accordance with claim 1 wherein said bypassing means includes said outlet means having first and second cylindrical tubes in sliding circumferential relationship with respect to one another and wherein said ceramic filter element has a ring-shaped cross-section with an internal opening sized to receive said tubes, one of said first and second tubes being closed at said upstream end, said first and second tubes including first and second sets of openings upstream and downstream from said ceramic filter element, respectively, said bypassing means further including means for moving said first set of openings into registration with one another while moving said second set of openings out of registration with one another and vice versa, said regenerating means including means for heating said filtering means and means for directing combustion air through said heating means toward said filter element, said directing means during regeneration creating pressure to prevent said exhaust gases from flowing through said ceramic filter element and rather forcing said exhaust gases through said tubes thereby bypassing said ceramic filter element.

4. Apparatus in accordance with claim 1 wherein said means for filtering includes a plurality of ceramic filter elements with each being separated from others by an impermeable barrier, said regenerating means and said controlling means being formed to regenerate less than all said ceramic filter elements at one time.

5. Apparatus in accordance with claim 4 wherein said bypassing means includes said outlet means having inner and outer cylindrical tubes in sliding circumferential relationship with respect to one another and wherein first and second of said ceramic filter elements are formed to receive said tubes, said first and second ceramic filter elements being positioned along said tubes with said first ceramic filter element being upstream from said second ceramic filter element, one of said inner and outer tubes being closed at said upstream end, said inner and outer tubes including upstream and downstream sets of openings with respect to each of said first and second ceramic filter elements, said inner and outer tubes also including an intermediate set of openings between said sets associated with each of said first and second ceramic filter elements, said inner tube having a separating wall between said intermediate set of openings and said upstream set of openings associated with said second ceramic filter element, said bypassing means further including means for moving said first set of openings associated with said first ceramic filter element and said second set of openings associated with said second ceramic filter element into registration with one another while moving said second set of openings associated with said first ceramic filter element and said first set of openings associated with said second ceramic filter element out of registration with one another and vice versa, said intermediate set of openings formed to be in open registration for both positions of said other sets, said bypassing means still further including means for directing said exhaust gases into said open set of openings associated with said first ceramic filter element and out said intermediate openings and into said open set of openings associated with said second ceramic filter element, whereby one of said first and second ceramic filter elements is available for filtering and the other is available for regenerating.

6. Apparatus for processing exhaust gases from an engine, said exhaust gases flowing from a first fluid communication line to a second fluid communication line, said first line being upstream from said second line, said apparatus comprising:
- a housing in fluid communication with one of said first and second lines;
- means, within said housing, for filtering said exhaust gases, said filtering means including a ceramic filter element;
- means for regenerating said ceramic filter element;
- means for bypassing said filtering means, said bypassing means including a first cylindrical tube fixed with respect to the other of said first and second lines and in fluid communication with said housing, said first tube having a first side wall and a first opening therein, a second cylindrical tube fitting in sliding circumferential relationship with said first tube, said second tube having a second side wall and a second opening therein;
- means for moving said second tube so that said second opening moves into and out of registration with said first opening; and
- means for controlling said moving means.

7. Apparatus in accordance with claim 6 wherein a said first tube includes a third opening and said second tube includes a fourth opening, said third and fourth openings being downstream from said ceramic filter element, said moving means moving said second tube so that said fourth opening moves into and out of registration with said third opening when said second opening moves into and out of registration with said first opening.

8. Apparatus in accordance with claim 7 wherein said moving means includes means passing through said second line at a location downstream from said housing for connecting with said second tube and means for driving said connecting means to move said second tube.

9. Apparatus in accordance with claim 8 including means for aspirating near said location so that leakage through said second line is in a direction from external of said second line to internal.

10. Apparatus for processing exhaust gases from an engine, said apparatus comprising:
- a housing with inlet means, outlet means, and first and second fluid flow paths with respect to said inlet means upstream and said outlet means downstream;
- an acoustic element within said housing for attenuating the sound of said exhaust gases along said first and second fluid flow paths;
- means, within said housing, for filtering the particulates from said exhaust gases along said first fluid flow path;
- means forming a section of said second fluid flow path for bypassing a portion of said filtering means to direct said exhaust gases from said first fluid flow path to said second fluid flow path, said bypassing means including an upstream tubular shutter valve, a downstream tubular shutter valve, and tubular means for connecting said upstream and downstream valves, said filtering means being formed to receive said tubular connecting means;
- means for regenerating said filtering means; and
- means for controlling said regenerating means and said bypassing means.

11. Apparatus for processing exhaust gases from an engine; said apparatus comprising:
(a) a housing defining an internal chamber;
(b) a particulate trap core positioned with said housing internal chamber; said particulate trap core having a central bore extending therethrough;
(c) a tubular shutter valve arrangement operably positioned within said trap core central bore; said tubular shutter valve comprising first and second tubular members,
  (i) a first of said tubular members being positioned inside of a second of said tubular members; and,
  (ii) one of said tubular members having a longitudinal slit extending completely along a longitudinal extension thereof;
(d) means for selectively orienting said first and second tubular members between first and second orientations;
  (i) said first and second tubular members being constructed and arranged such that when in said first orientation, exhaust gas flow is directed through said tubular shutter valve assembly and through said trap core central bore; and,
  (ii) said first and second tubular members being constructed and arranged such that when in said second orientation exhaust gas flow through said tubular shutter valve and said particulate trap core central bore is blocked.

* * * * *